United States Patent
Damnjanovic et al.

(10) Patent No.: US 9,900,923 B2
(45) Date of Patent: Feb. 20, 2018

(54) TECHNIQUES FOR USING CARRIER AGGREGATION IN DUAL CONNECTIVITY WIRELESS COMMUNICATIONS

(71) Applicant: QUALCOMM Incorporated, San Diego, CA (US)

(72) Inventors: Jelena Damnjanovic, Del Mar, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 14/522,386

(22) Filed: Oct. 23, 2014

(65) Prior Publication Data

US 2015/0124743 A1    May 7, 2015

Related U.S. Application Data

(60) Provisional application No. 61/899,127, filed on Nov. 1, 2013.

(51) Int. Cl.
| | |
|---|---|
| *H04W 76/02* | (2009.01) |
| *H04W 36/28* | (2009.01) |
| *H04L 5/00* | (2006.01) |

(52) U.S. Cl.
CPC ......... *H04W 76/025* (2013.01); *H04L 5/001* (2013.01); *H04L 5/0032* (2013.01); *H04W 36/28* (2013.01)

(58) Field of Classification Search
CPC ..... H04L 5/001; H04L 5/0053; H04L 5/0098; H04L 5/0048; H04L 5/0035; H04L 5/003;

(Continued)

(56) References Cited

U.S. PATENT DOCUMENTS

| 2010/0238880 A1* | 9/2010 | Wu .................. H04W 76/048 370/329 |
| 2011/0243016 A1* | 10/2011 | Zhang .............. H04W 52/365 370/252 |

(Continued)

FOREIGN PATENT DOCUMENTS

WO    WO-2013/052805 A1    4/2013

OTHER PUBLICATIONS

3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release), 3GPP Standard; 3GPP TR 36.842, 3rd Generation Partnership Project (3GPP), Mobile Competence Centre; 650, Route Des Lucioles; F-06921 Sophia-Antipolis Cedex; France, vol. RAN WG2, No. V0.4.0, Oct. 21, 2013 (Oct. 21, 2013), pp. 1-52, XP050769478, [retrieved on Oct. 21, 2013] Sections 3.1 and 8.1.

(Continued)

*Primary Examiner* — Yemane Mesfin
*Assistant Examiner* — Peter Chen
(74) *Attorney, Agent, or Firm* — Arent Fox LLP

(57) ABSTRACT

Certain aspects of the present disclosure relate to procedures for aggregation in dual connectivity. In one aspect, a wireless device may receive configuration information to communicate with a first network entity (e.g., master eNodeB) through a first primary cell (PCell) of a corresponding group of cells of the first network entity, and with a second network entity (e.g., secondary eNodeB) through a second primary cell (PCell$_{SCG}$) of a corresponding group of cells of the second network entity. The second network entity may be non-collocated with the first network entity. The wireless device may include an information convergence entity (e.g., PDCP entity) that aggregates the configuration information (Continued)

from the first and second network entities when the wireless device is in communication with both entities. In another aspect, the second network entity may have one of the cells in the corresponding group of cells operate as the second primary cell.

33 Claims, 11 Drawing Sheets

(58) Field of Classification Search
CPC .. H04L 5/0032; H04L 27/2662; H04W 36/25; H04W 72/025; H04W 72/0413; H04W 72/0453; H04W 72/0446; H04W 74/0833; H04W 74/006; H04W 74/004; H04W 88/02; H04W 56/001
See application file for complete search history.

(56) References Cited

U.S. PATENT DOCUMENTS

| | | | | |
|---|---|---|---|---|
| 2012/0257513 | A1* | 10/2012 | Yamada | H04L 1/0618 370/248 |
| 2015/0215926 | A1* | 7/2015 | Huang | H04W 36/0061 370/329 |
| 2015/0271809 | A1* | 9/2015 | Kato | H04W 72/1263 370/329 |
| 2016/0073442 | A1* | 3/2016 | Koskinen | H04W 76/025 370/329 |

OTHER PUBLICATIONS

International Search Report and Written Opinion—PCT/US2014/062294—ISA/EPO—Feb. 2, 2015. (15 total pages).

Mediatek Inc: "Deployment scenarios of FDD-TDD joint operation", 3GPP Draft; R1-133288 Deployment Scenarios of FDD-TDD Joint Operation Final, 3rd Generation Partnership Project (3GPP), Mobile Competence Centre ; 650, Route Des Lucioles ; F-06921 Sophia-Antipolis CE, vol. RAN WG1, Meeting #74, Barcelona. Spain; Aug. 19, 2013-Aug. 23, 2013, Aug. 10, 2013 (Aug. 10, 2013), XP050716438, Retrieved from the Internet: URL: http://www.3gpp.org/ftp/tsg_ran/WG1_RL1/TSGR1_74/Docs/ [retrieved on Aug. 10, 2013] Section 2.2.3; figure 7, Case 3 in section 2.3.

Mediatek Inc: "U-Plane Architecture" 3GPP Draft; R2-131168 U-Plane Architecture, 3rd Generation Partnership Project (3GPP), Mobile Competence Centre; 650, Route Des Lucioles; F-06921 Sophia-Antipolis Cedex; France, vol. RAN WG2, No. 81bis Meeting Chicago, USA; Apr. 15, 2013-Apr. 19, 2013, Apr. 6, 2013 (Apr. 6, 2013), XP050699435, Retrieved from the Internet: URL:http://www.3gpp.org/ftp/tsg_ran/WG2_RL2/TSGR2_81bis/Docs/ [retrieved on Apr. 6, 2013] figure 4 Sections 1, 2, 3 and 4.

Qualcomm Incorporated: "Procedures for dual connectivity", 3GPP Draft; R2-134002 Procedures for Dual Connectivity, 3rd Generation Partnership Project (3GPP), Mobile Competence Centre; 650, Route Des Lucioles; F-06921 Sophia-Antipolis Cedex; France, vol. RAN WG2, No. 84 San Francisco, USA; Nov. 11, 2013-Nov. 15, 2013, Nov. 13, 2013 (Nov. 13, 2013), XP050736810, Retrieved from the Internet: URL: http://www.3gpp.org/ftp/Meetings_3GPP_SYNC/RAN/RAN2/Docs/ [retrieved on Nov. 13, 2013] Section 2.1; table 1 Sections 2.3 and 2.4.

RAN2 Chairman (Ericsson): "Proposed Agenda", 3GPP Draft; RAN2-83BIS Chairman Notes Oct. 11, 2013 1630, 3rd Generation Partnership Project (3GPP), Mobile Competence Centre; 650, Route Des Lucioles; F-06921 Sophia-Antipolis Cedex; France, vol. RAN WG2, No. 83bis Ljubljana, Slovenia; Oct. 7, 2013-Oct. 11, 2013, Oct. 11, 2013 (Oct. 11, 2013), XP050752867, Retrieved from the Internet: URL: http://www.3gpp.org/ftp/tsg_ran/WG2_RL2/TSGR2_83bis/Report/tmp/ [retrieved on Oct. 11, 2013] p. 38-p. 39.

* cited by examiner

TECHNIQUES FOR USING CARRIER AGGREGATION IN DUAL CONNECTIVITY WIRELESS COMMUNICATIONS

CLAIM OF PRIORITY UNDER 35 U.S.C. §119

The present application for patent claims priority to U.S. Provisional Application No. 61/899,127 entitled "Techniques for Using Carrier Aggregation in Dual Connectivity Wireless Communications" filed Nov. 1, 2013, assigned to the assignee hereof and hereby expressly incorporated by reference.

FIELD OF THE DISCLOSURE

Aspects of the present disclosure relate generally to wireless communications, and more particularly, to techniques for using carrier aggregation in dual connectivity wireless communications.

BACKGROUND OF THE DISCLOSURE

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations (e.g., eNodeBs) that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

To improve the performance of wireless communications, it may be desirable to aggregate component carriers (CCs) when communicating with a UE in order to increase the bandwidth, and thereby increase the bitrates. When such aggregation involves component carriers that originate from a same eNodeB or from collocated base stations (e.g., eNodeBs and/or access points (APs)), it may be possible to coordinate the operation of the aggregated component carriers through internal communications in the eNodeB or through fast connections between the collocated base stations. In other scenarios, however, the ability to coordinate the aggregation of component carriers becomes more challenging.

In view of the foregoing, it may be understood that there may be significant problems and shortcomings associated with current carrier aggregation technology.

SUMMARY OF THE DISCLOSURE

Aspects of the present disclosure relate generally to wireless communications, and more particularly, to techniques for using carrier aggregation in dual connectivity wireless communications. For example, techniques for using carrier aggregation when a wireless device is connected to non-collocated network entities are described herein. In dual connectivity wireless communications, a wireless device may be communicatively connected to more than one network entity (e.g., eNodeBs and/or access points (APs)).

In accordance with an aspect, a wireless device (e.g., UE), may receive first configuration information to communicate with a first network entity (e.g., a master eNodeB (MeNodeB or MeNB)) through a first primary cell of the first network entity (e.g., a master cell group primary cell or PCell). The wireless device may receive second configuration information to communicate with a second network entity (e.g., a secondary eNodeB (SeNodeB or SeNB)) through a second primary cell of the second network entity (e.g., a secondary cell group primary cell or $PCell_{SCG}$). The second network entity may be non-collocated with the first network entity. An information convergence entity in the wireless device may aggregate the first and second configuration information received from the network entities when the wireless device is in communication with the first network entity and the second network entity.

In accordance with another aspect, an apparatus for aggregating data in wireless communications is described that includes means for receiving, at a wireless device, first configuration information to communicate with a first network entity through a first primary cell of the first network entity, means for receiving, at the wireless device, second configuration information to communicate with a second network entity through a second primary cell of the second network entity, and means for aggregating, at an information convergence entity in the wireless device, the first configuration information from the first network entity and the second configuration information from the second network entity when the wireless device is in communication with the first network entity and the second network entity.

In accordance with yet another aspect, a computer readable medium storing computer executable code is described that includes code for receiving, at a wireless device, first configuration information to communicate with a first network entity through a first primary cell of the first network entity, code for receiving, at the wireless device, second configuration information to communicate with a second network entity through a second primary cell of the second network entity, and code for aggregating, at an information convergence entity in the wireless device, the first configuration information from the first network entity and the second configuration information from the second network entity when the wireless device is in communication with the first network entity and the second network entity.

In accordance with yet another aspect, a communications device for aggregating data in wireless communications is described that includes a carrier aggregation manager component configured to receive first configuration information to communicate with a first network entity through a first primary cell of the first network entity, wherein the carrier aggregation manager component is further configured to receive second configuration information to communicate with a second network entity through a second primary cell of the second network entity. The communications device may also include an information convergence entity configured to aggregate the first configuration information from the first network entity and the second configuration information from the second network entity when the wireless device is in communication with the first network entity and the second network entity.

In accordance with another aspect, a second network entity (e.g., SeNodeB or SeNB) may be configured to operate a cell in a second set of cells as a second primary cell (e.g., $PCell_{SCG}$). The second network entity may transmit, to a wireless device, configuration information through the second primary cell (e.g., $PCell_{SCG}$) for the wireless device to communicate with the second network entity while in communication with a first network entity (e.g., MeNodeB or MeNB) operating a first set of cells having a first primary cell (e.g., PCell). The first network entity may be non-collocated with the second network entity.

In accordance with another aspect, an apparatus for aggregating data in wireless communications is described that includes means for configuring a second network entity to operate a cell in a second set of cells as a second primary cell, and means for transmitting, to a wireless device, configuration information through the second primary cell for the wireless device to communicate with the second network entity while in communication with a first network entity operating a first set of cells having a first primary cell.

In accordance with yet another aspect, a computer readable storage medium storing computer executable code is described that includes code for configuring a second network entity to operate a cell in a second set of cells as a second primary cell, and code for transmitting, to a wireless device, configuration information through the second primary cell for the wireless device to communicate with the second network entity while in communication with a first network entity operating a first set of cells having a first primary cell.

In accordance with yet another aspect, a network device for aggregating data in wireless communications is described that includes a carrier aggregation manager component configured to configure a second network entity to operate a cell in a second set of cells as a second primary cell. The network device may also include a transmitter component configured to transmit, to a wireless device, configuration information through the second primary cell for the wireless device to communicate with the second network entity while in communication with a first network entity operating a first set of cells having a first primary cell.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
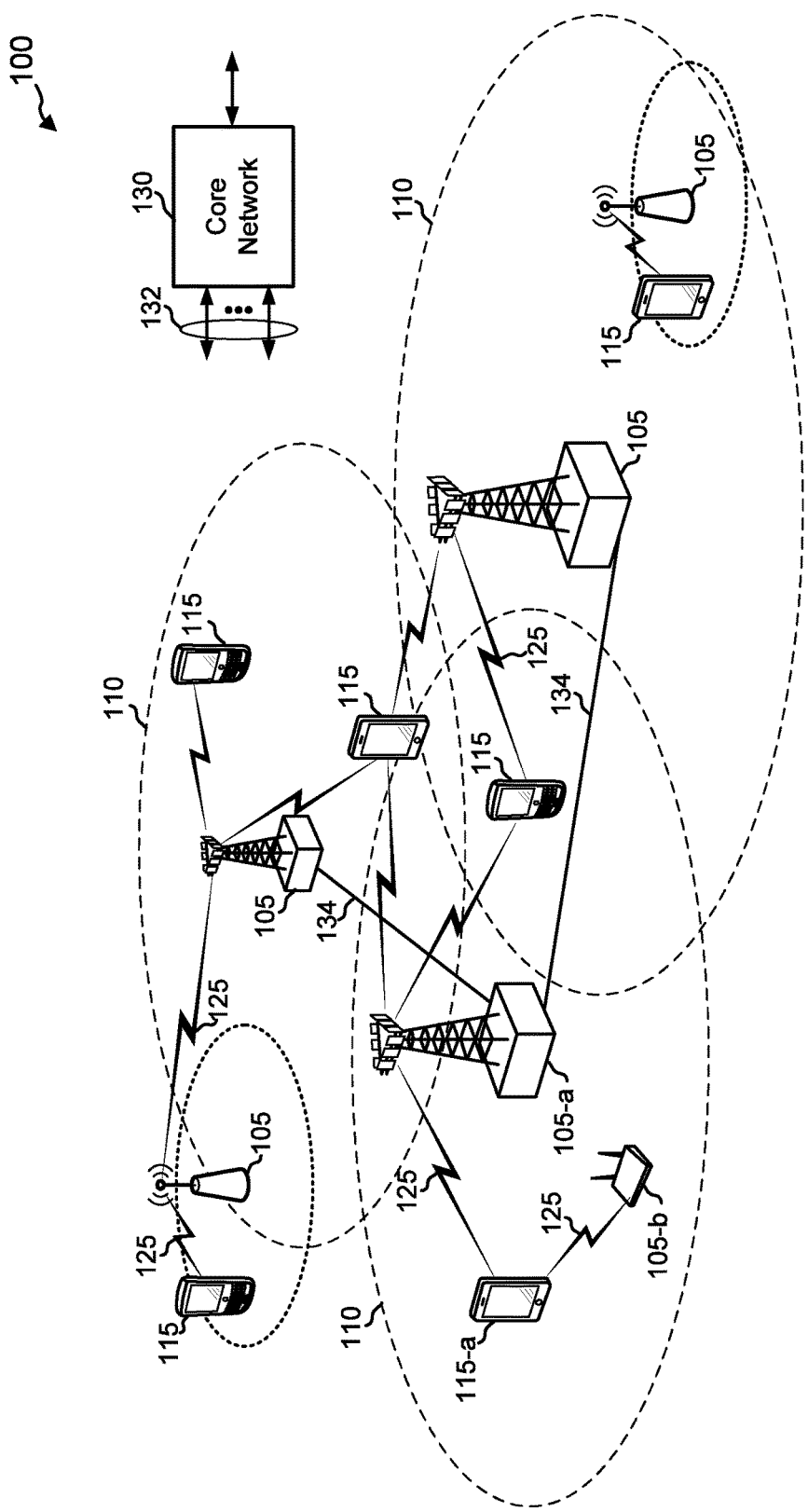
FIG. 1 is a block diagram conceptually illustrating an example of a wireless communications system, in accordance with an aspect of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Various methods, apparatuses, devices, and systems are described for carrier aggregation when a wireless device is connected to more than one network entity (e.g., multiple connectivity). In some aspects, a wireless device (e.g., UE), may receive first configuration information to communicate with a first network entity (e.g., a master eNodeB, also referred to as an MeNodeB or MeNB) through a first primary cell of the first network entity (e.g., a master cell group primary cell or PCell). The wireless device may receive second configuration information to communicate with a second network entity (e.g., a secondary eNodeB, also referred to as an SeNodeB or SeNB) through a second primary cell of the second network entity (e.g., a secondary cell group primary cell or $PCell_{SCG}$). The second network entity may be non-collocated with the first network entity. For example, the second network entity may be disparate from the first network entity and first network entity and the second network entity may be connected via a communication link (e.g., backhaul X2 communication link). An information convergence entity in the wireless device may aggregate configuration information received from the first network entity and the second network entity when the wireless device is in communication (e.g., concurrent communication) with the first network entity and the second network entity.

In some aspects of multiple connectivity, a wireless device may be communicatively coupled to a plurality of network entities. For example, a first network entity (e.g., MeNodeB or MeNB) may be configured to operate a master cell group (MCG) including one or more cells (e.g., each cell in the MCG may operate in different frequency bands and may include one or more component carriers (CCs)). A cell in the MCG may be designated or configured as a first primary cell of the MCG (e.g., PCell). A second network entity (e.g., SeNodeB or SeNB) may be configured to operate a secondary cell group (SCG) including one or more cells (e.g., each cell in the SCG may operate in different frequency bands and may include one or more component carriers (CCs)). A cell in the SCG may be designated or configured as a first primary cell of the SCG (e.g., $PCell_{SCG}$). For example, the wireless device may receive configuration information from the first network entity via the first primary cell (e.g., PCell) and configuration information from the second network entity via the second primary cell (e.g., $PCell_{SCG}$). The first network entity may be non-collocated with the second network entity. Aspects of the connectivity of the wireless device to an MeNB and a SeNB may include modifications and/or enhancements to various procedures (e.g., physical layer (PHY) procedures and/or media access control (MAC) layer procedures).

In some aspects, when a wireless device (e.g., UE) is connected to one MeNB and one SeNB (e.g., dual connectivity), a timing advanced group (TAG) may include cells of one just one eNB. There may be instances in dual connectivity in which there is one PCell in the MeNB and another in the SeNB, or there is just one PCell per wireless device. With respect to carrier aggregation (CA) in dual connectivity, it may be desirable to enable packet and/or bearer aggregation by radio resource control (RRC) configuration to limit the number of changes in the protocol stack for different configurations. For example, it may be desirable to include contention-based and contention free random access (RA) procedures allowed towards the SeNB (e.g., message 2 sent by SeNB), separate discontinuous reception (DRX) procedures at MeNB and SeNB (with possible coordination), and having the wireless device send a buffer status report (BSR) for bearer aggregation to the eNB where the bearer is served. Other aspects that may be desirable include sending BSR for packet aggregation, power headroom reporting (PHR), power control, sounding reference signal (SRS), and logical channel (LC) prioritization In other aspects, carrier aggregation procedures associated with dual or multiple connectivity may include some PCell-specific functionalities. For example, the PCell may handle certain functionalities such as physical uplink control channel (PUCCH), contention-based random access control channel (RACH), and semi-persistent scheduling to name a few. In dual connectivity, carrier aggregation may involve certain enhancements or modifications. Some of these enhancements or modification may include having, for example, five (5) total component carriers per wireless device (e.g., UE) for carrier aggregation. Another enhancement or modification may include having, for example, four (4) TAGs per UE for carrier aggregation. Moreover, carrier aggregation may be supported in an MeNB and in an SeNB, that is, the MeNB and the SeNB may have multiple service cells for the wireless device. In addition, and as described herein, a master cell group or MCG may be a group of the serving cells associated with the MeNB, while a secondary cell group or SCG may be a group of the serving cells associated with the SeNB.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of UMTS. 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

FIG. 1 is a block diagram conceptually illustrating an example of a wireless communications system 100, in accordance with an aspect of the present disclosure. For example, at least portions of the communications system 100 may be configured for implementing carrier aggregation in dual connectivity. In some aspects, carrier aggregation may involve bearer aggregation and/or packet aggregation. The wireless communications system 100 includes base stations (or cells) 105, user equipment (UEs) 115, and a core network 130. The base stations 105 may communicate with the UEs 115 under the control of a base station controller (not shown), which may be part of the core network 130 or the base stations 105 in various embodiments. The base stations 105 may communicate control information and/or user data with the core network 130 through first backhaul links 132. In embodiments, the base stations 105 may communicate, either directly or indirectly, with each other over second backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc. The wireless communications system 100 may also support operation on multiple flows at the same time. In some aspects, the multiple flows may correspond to multiple wireless wide area networks (WWANs) or cellular flows. In other aspects, the multiple flows may correspond to a combination of WWANs or cellular flows and wireless local area networks (WLANs) or Wi-Fi flows.

The base stations 105 may wirelessly communicate with the UEs 115 via one or more base station antennas. Each of the base stations 105 sites may provide communication coverage for a respective geographic coverage area 110. In some embodiments, base stations 105 may be referred to as a base transceiver station, a radio base station, an access point, a radio transceiver, a basic service set (BSS), an extended service set (ESS), a NodeB, eNodeB, Home NodeB, a Home eNodeB, or some other suitable terminology. As described above, a master eNodeB may also referred to as an MeNodeB or MeNB, while a secondary eNodeB may also referred to as an SeNodeB or SeNB. The geographic coverage area 110 for a base station 105 may be divided into sectors making up only a portion of the coverage area (not shown). The wireless communications system 100 may include base stations 105 of different types (e.g., macro, micro, and/or pico base stations). There may be overlapping coverage areas for different technologies.

In implementations, the wireless communications system 100 is an LTE/LTE-A network communication system. In LTE/LTE-A network communication systems, the terms evolved Node B (eNodeB) may be generally used to describe the base stations 105. The wireless communications system 100 may be a Heterogeneous LTE/LTE-A network in which different types of eNodeBs provide coverage for various geographical regions. For example, each eNodeB 105 may provide communication coverage for a macro cell, a pico cell, a femto cell, and/or other types of cell. A macro cell generally covers a relatively large geographic area (e.g., several kilometers in radius) and may allow unrestricted access by UEs 115 with service subscriptions with the network provider. A pico cell would generally cover a relatively smaller geographic area (e.g., buildings) and may allow unrestricted access by UEs 115 with service subscriptions with the network provider. A femto cell would also generally cover a relatively small geographic area (e.g., a home) and, in addition to unrestricted access, may also provide restricted access by UEs 115 having an association with the femto cell (e.g., UEs 115 in a closed subscriber group (CSG), UEs 115 for users in the home, and the like). An eNodeB 105 for a macro cell may be referred to as a macro eNodeB. An eNodeB 105 for a pico cell may be referred to as a pico eNodeB. And, an eNodeB 105 for a femto cell may be referred to as a femto eNodeB or a home eNodeB. An eNodeB 105 may support one or multiple (e.g., two, three, four, and the like) cells. The wireless communications system 100 may support use of LTE and WLAN or Wi-Fi by one or more of the UEs 115.

The term "small cell" may refer to an access point or base station, or to a corresponding coverage area of the access point or the base station, where the access point or base station in this case has a relatively low transmit power or relatively small coverage as compared to, for example, the transmit power or coverage area of a macro network access point or macro cell. For instance, and as noted above, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a micro node, a NodeB, evolved NodeB (eNB), home NodeB (HNB) or home evolved NodeB (HeNB). Therefore, the term "small cell" can be used to refer to a relatively low transmit power and/or a relatively small coverage area cell as compared to a macro cell. In some implementations, one or more cells associated with an MeNB and/or one or more cells associated with an SeNB may be small cells.

The core network 130 may communicate with the eNodeBs 105 or other base stations 105 via first backhaul links 132 (e.g., S1 interface, etc.). The eNodeBs 105 may also communicate with one another, e.g., directly or indirectly via second backhaul links 134 (e.g., X2 interface, etc.) and/or via the first backhaul links 132 (e.g., through core network 130). The wireless communications system 100 may support synchronous or asynchronous operation. For synchronous operation, the eNodeBs 105 may have similar frame timing, and transmissions from different eNodeBs 105 may be approximately aligned in time. For asynchronous operation, the eNodeBs 105 may have different frame timing, and transmissions from different eNodeBs 105 may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a device for the Internet of Things (IoT), or the like. A UE 115 may be able to communicate with macro eNodeBs, pico eNodeBs, femto eNodeBs, relays, and the like.

The communication links 125 shown in the wireless communications system 100 may include uplink (UL) transmissions from a UE 115 to an eNodeB 105, and/or downlink (DL) transmissions, from an eNodeB 105 to a UE 115. The downlink transmissions may also be called forward link transmissions while the uplink transmissions may also be called reverse link transmissions.

In certain aspects of the wireless communications system 100, a UE 115 may be configured to support carrier aggregation (CA) with two or more eNodeBs 105. Carrier aggregation may include, in some aspects, one or both of bearer aggregation and packet aggregation. Each aggregated carrier may be referred to as a component carrier (CC), and the individual component carriers may have the same or different bandwidths. The number of component carriers used for uplink (UL) may be the same or lower than the number of component carriers used for downlink (DL). The eNodeBs 105 that are used for carrier aggregation may be collocated or may be connected through fast connections. In either case, coordinating the aggregation of component carriers for wireless communications between the UE 115 and the eNodeBs 105 may be carried out more easily because information can be readily shared between the various cells being used to perform the carrier aggregation. When the eNodeBs 105 that are used for carrier aggregation are non-collocated (e.g., far apart or do not have a high-speed connection between them), then coordinating the aggregation of component carriers may involve additional aspects, which are described herein. For example, in carrier aggregation for dual connectivity (e.g., UE 115 connected to two non-collocated eNodeBs 105), the UE 115 may receive configuration information to communicate with a first eNodeB 105 (e.g., SeNodeB or SeNB) through a primary cell of the first eNodeB 105 (see e.g., FIG. 5). The first eNodeB 105 may include a group of cells referred to as a secondary cell group, or SCG, which includes one or more secondary cells and the primary cell, or $PCell_{SCG}$, of the first eNodeB 105. The UE 115 may also receive configuration information to communicate with a second eNodeB 105 (e.g., MeNodeB or MeNB) through a second primary cell of the second eNodeB 105. The second eNodeB 105 may include a group of cells referred to as a master cell group, or MCG, which includes one or more secondary cells and the primary cell, or PCell, of the second eNodeB 105. As indicated above, the first and second eNodeBs 105 may not be collocated or may not have a fast connection between them, in which case carrier aggregation may involve different aspects from when such entities are collocated or have a fast connection between them. The UE 115 may include an information convergence entity (see, e.g., information convergence entity component 670 in FIG. 6 and described below) that may aggregate information (e.g., data packets) received from the first eNodeB 105 and the second eNodeB 105 when the UE 115 is in concurrent communication with both eNodeBs. The information convergence entity may allow the data communicated over different component carriers to be aggregated or combined at the UE 115.

In certain aspects of the wireless communications system 100, carrier aggregation for dual connectivity may involve having a secondary eNodeB 105 (e.g., SeNodeB or SeNB) be configured to operate one of its cells as a $PCell_{SCG}$. The secondary eNodeB 105 may transmit, to a UE 115, configuration information through the $PCell_{SCG}$ for the UE 115 to communicate with the secondary eNodeB 105 while the UE 115 is in communication with a master eNodeB 105 (e.g., MeNodeB or MeNB). The master eNodeB 105 may transmit, to the same UE 115, configuration information via its PCell for that UE 115 to communication with the other eNodeB 105. The two eNodeBs 105 may be non-collocated. In some implementations, the features, aspects, and/or techniques described herein may be applied to scenarios in which there are multiple connections between a UE (e.g., UE 115) and eNodeBs. In such scenarios, one of the several eNodeBs may operate as the MeNodeB or MeNB.

In some aspects of the communications system 100, for a UE 115 in dual connectivity, a PCell may be implemented in an eNodeB 105 operating as the MeNB and a $PCell_{SCG}$ may be implemented in another eNodeB 105 operating as the SeNB. In a different implementation, there may be one PCell per UE 115 in dual connectivity. In this latter case, upper layer functionality related to the PCell need not be changed and other functionality may be implemented in such a way as to minimize or reduce any impact on protocol specification. One approach may include having the PCell retain its per UE functionality with respect to initial configuration, security, system information, and/or radio link failure (RLF). The PCell may be configured as one of the cells of the MeNB, belonging to the MCG associated with the MeNB (see e.g., FIG. 5). PUCCH may be used in the configuration of the PCell. Moreover, the PCell may provide the lower layer functionality within the MCG.

Figure 2:
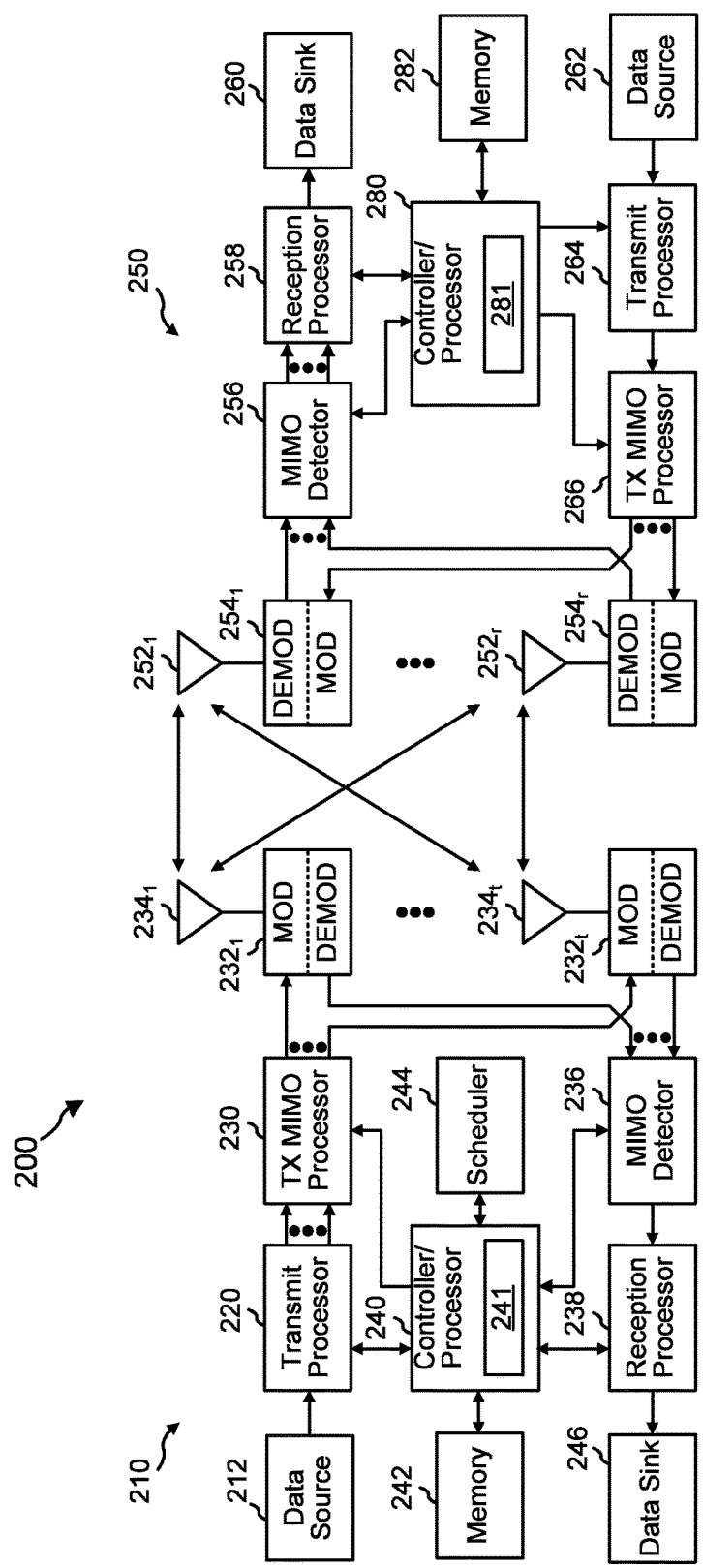
FIG. 2 is a block diagram conceptually illustrating examples of an eNodeB and a UE, in accordance with an aspect of the present disclosure.

FIG. 2 is a block diagram conceptually illustrating examples of an eNodeB 210 and a UE 250 configured in accordance with an aspect of the present disclosure. For example, the base station/eNodeB 210 and the UE 250 of a system 200, as shown in FIG. 2, may be one of the base stations/eNodeBs and one of the UEs in FIG. 1, respectively. In some aspects, the eNodeB 210 may support or may be used in association with multiple connectivity (e.g., dual connectivity) carrier aggregation. In one aspect, the eNodeB 210 may be an MeNodeB or MeNB having one of the cells in its MCG configured as a PCell. In another aspect, the eNodeB 210 may be an SeNodeB or SeNB having one of its cells in its SCG configured as a $PCell_{SCG}$. In some aspects, the UE 250 may also support multiple connectivity carrier aggregation. For example, the UE 250 may be configured to aggregate information, such as configuration information, from different eNodeBs. The UE 250 may receive configuration information from the eNodeB 210 via the PCell and/or the $PCell_{SCG}$. The eNodeB 210 may be equipped with antennas $234_{1-t}$, and the UE 250 may be equipped with antennas $252_{1-r}$, wherein t and r are integers greater than or equal to one.

At the eNodeB 210, a base station transmit processor 220 may receive data from a base station data source 212 and control information from a base station controller/processor 240. The control information may be carried on the PBCH, PCFICH, PHICH, PDCCH, etc. The data may be carried on the PDSCH, etc. The base station transmit processor 220 may process (e.g., encode and symbol map) the data and control information to obtain data symbols and control symbols, respectively. The base station transmit processor 220 may also generate reference symbols, e.g., for the PSS, SSS, and cell-specific reference signal (RS). A base station transmit (TX) multiple-input multiple-output (MIMO) processor 230 may perform spatial processing (e.g., precoding) on the data symbols, the control symbols, and/or the reference symbols, if applicable, and may provide output symbol streams to the base station modulators/demodulators (MODs/DEMODs) $232_{1-t}$. Each base station modulator/demodulator 232 may process a respective output symbol stream (e.g., for OFDM, etc.) to obtain an output sample stream. Each base station modulator/demodulator 232 may further process (e.g., convert to analog, amplify, filter, and upconvert) the output sample stream to obtain a downlink signal. Downlink signals from modulators/demodulators $232_{1-t}$ may be transmitted via the antennas $234_{1-t}$, respectively.

At the UE 250, the UE antennas $252_{1-r}$ may receive the downlink signals from the base station 210 and may provide received signals to the UE modulators/demodulators (MODs/DEMODs) $254_{1-r}$, respectively. Each UE modulator/demodulator 254 may condition (e.g., filter, amplify, downconvert, and digitize) a respective received signal to obtain input samples. Each UE modulator/demodulator 254 may further process the input samples (e.g., for OFDM, etc.) to obtain received symbols. A UE MIMO detector 256 may obtain received symbols from all the UE modulators/demodulators $254_{1-r}$, and perform MIMO detection on the received symbols if applicable, and provide detected symbols. A UE reception processor 258 may process (e.g., demodulate, deinterleave, and decode) the detected symbols, provide decoded data for the UE 250 to a UE data sink 260, and provide decoded control information to a UE controller/processor 280.

On the uplink, at the UE 250, a UE transmit processor 264 may receive and process data (e.g., for the PUSCH) from a UE data source 262 and control information (e.g., for the PUCCH) from the UE controller/processor 280. The UE transmit processor 264 may also generate reference symbols for a reference signal. The symbols from the UE transmit processor 264 may be precoded by a UE TX MIMO processor 266 if applicable, further processed by the UE modulator/demodulators $254_{1-r}$ (e.g., for SC-FDM, etc.), and transmitted to the eNodeB 210. At the eNodeB 210, the uplink signals from the UE 250 may be received by the base station antennas 234, processed by the base station modulators/demodulators 232, detected by a base station MIMO detector 236 if applicable, and further processed by a base station reception processor 238 to obtain decoded data and control information sent by the UE 250. The base station reception processor 338 may provide the decoded data to a base station data sink 246 and the decoded control information to the base station controller/processor 240.

The base station controller/processor 240 and the UE controller/processor 280 may direct the operation at the eNodeB 210 and the UE 250, respectively. The base station controller/processor 240 and/or other processors and modules at the eNodeB 210 may perform or direct, e.g., the execution of functional blocks illustrated in FIG. 8 and FIG. 9, and/or other processes for the techniques or procedures described herein (e.g., flowchart illustrated in FIG. 11). In some aspects, at least a portion of the execution of these functional blocks and/or processes may be performed by block 241 in the base station controller/processor 240. It is to be understood that block 241, or at least portions of the operations of block 241, may be performed in other processors and modules of the eNodeB 210. The UE controller/processor 280 and/or other processors and modules at the UE 250 may also perform or direct, e.g., the execution of the functional blocks illustrated in FIG. 6 and/or FIG. 9, and/or other processes for the techniques described herein (e.g., flowchart illustrated in FIG. 10). In some aspects, at least a portion of the execution of these functional blocks and/or processes may be performed by block 281 in the UE controller/processor 280. It is to be understood that block 281, or at least portions of the operations of block 281, may be performed in other processors and modules of the UE 250. The base station memory 242 and the UE memory 282 may store data and program codes for the eNodeB 210 and the UE 250, respectively. For example, the UE memory 282 may store configuration information for multiple connectivity carrier aggregation provided by the eNodeB 210. A scheduler 244 may be used to schedule UE 250 for data transmission on the downlink and/or uplink.

In one configuration, the eNodeB 210 may include means for configuring a first network entity to operate a cell in a group of cells as a first primary cell. The base station 210 may include means for transmitting, to a wireless device (e.g., UE 250), configuration information through the first primary cell for the wireless device to communicate with the first network entity while in concurrent communication with a second network entity having a second primary cell, where the first network entity is non-collocated with the second network entity. In one aspect, the aforementioned means may be the base station controller/processor 240, the block 241, the base station memory 242, the base station transmit processor 220, the base station modulators/demodulators 232, and the base station antennas 234 configured to perform the functions recited by the aforementioned means. In another aspect, the aforementioned means may be a module, component, or any apparatus configured to perform the functions recited by the aforementioned means. Examples of such modules, components, or apparatus may be described with respect to FIG. 8 and/or FIG. 9.

In one configuration, the UE 250 may include means for receiving, at a wireless device, configuration information to communicate with a first network entity through a first primary cell of the first network entity. The UE 250 may include means for receiving, at the wireless device, configuration information to communicate with a second network entity through a second primary cell of the second network entity, the second network entity being non-collocated with the first network entity. The UE 250 may include means for aggregating, at an information convergence entity (see e.g., information convergence entity component 670 in FIG. 6) in the wireless device, information received from the first network entity and the second network entity when the wireless device is in communication with the first network entity and the second network entity. In one aspect, the aforementioned means may be the UE controller/processor 280, the block 281, the UE memory 282, the UE reception processor 258, the UE MIMO detector 256, the UE modulators/demodulators 254, and the UE antennas 252 configured to perform the functions recited by the aforementioned means. In another aspect, the aforementioned means may be a module, component, or any apparatus configured to perform the functions recited by the aforementioned means. Examples of such modules, components, or apparatus may be described with respect to FIG. 6 and/or FIG. 9.

Figure 3:
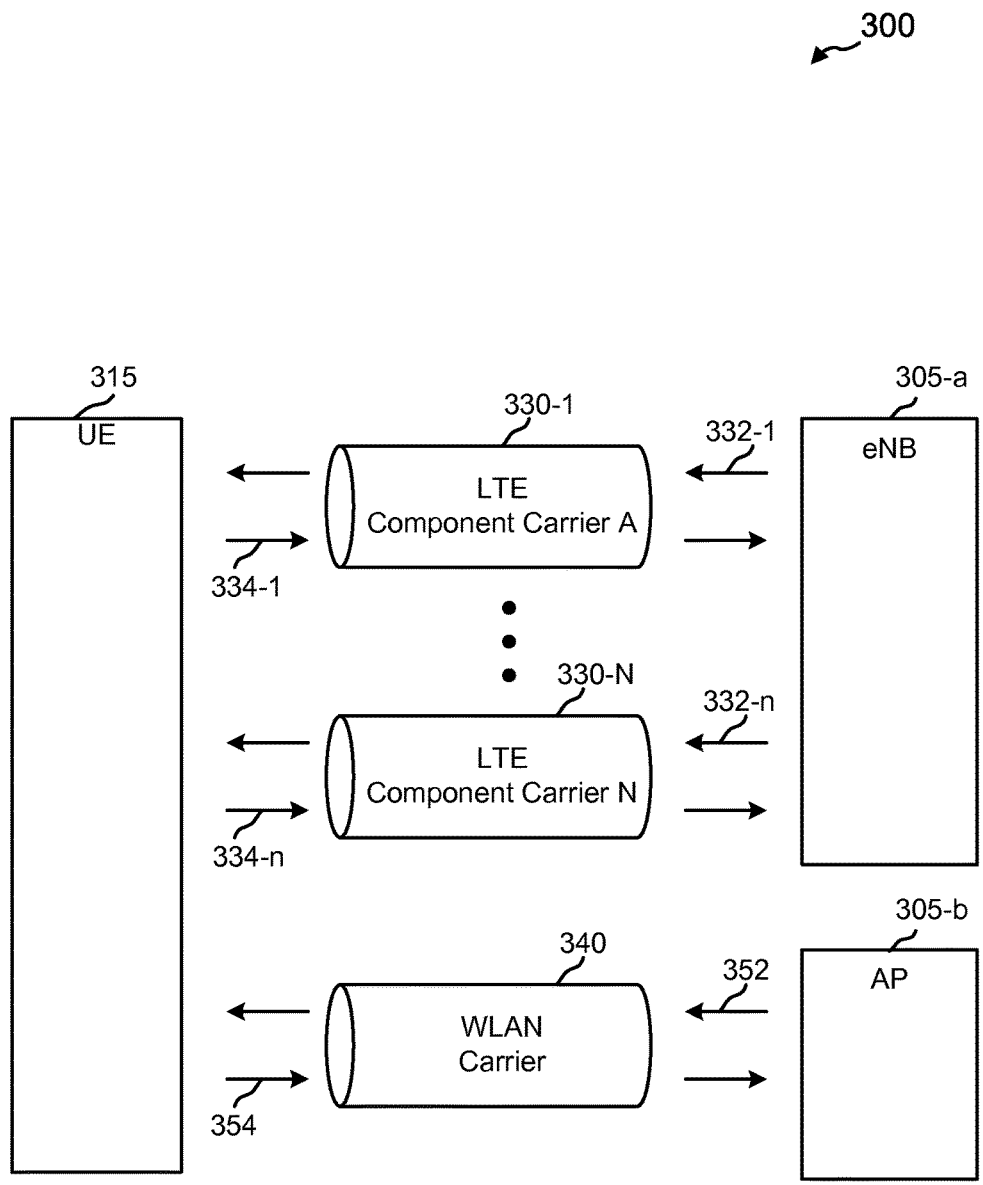
FIG. 3 is a block diagram conceptually illustrating an aggregation of radio access technologies at a UE, in accordance with an aspect of the present disclosure.

FIG. 3 is a block diagram conceptually illustrating an aggregation of radio access technologies at a UE, in accordance with an aspect of the present disclosure. The aggregation may occur in a system 300 including a multi-mode UE 315, which can communicate with an eNodeB 305-*a* using one or more component carriers 1 through N ($CC_1$-$CC_N$), and with a WLAN access point (AP) 305-*b* using WLAN carrier 340. A multi-mode UE in this example may refer to a UE that supports more than one radio access technology (RAT). For example, the UE 315 supports at least a WWAN radio access technology (e.g., LTE) and a WLAN radio access technology (e.g., Wi-Fi). A multi-mode UE may also support multiple connectivity (e.g., dual connectivity) carrier aggregation as described herein. The UE 315 may be an example of one of the UEs of FIG. 1, FIG. 2, FIG. 4, FIG. 5, FIG. 6, FIG. 7, and/or FIG. 8. The eNodeB 305-*a* may be an example of one of the eNodeBs or base stations of FIG. 1, FIG. 2, FIG. 4, FIG. 5, FIG. 6, FIG. 7, and/of FIG. 8. The AP 305-*b* may be an example of an AP of FIG. 4. While only one UE 305, one eNodeB 305-*a*, and one AP 305-*b* are illustrated in FIG. 3, it will be appreciated that the system 300 can include any number of UEs 305, eNodeBs 305-*a*, and/or APs 305-*b*.

The eNodeB 305-*a* can transmit information to the UE 315 over forward (downlink) channels 332-1 through 332-N on LTE component carriers $CC_1$ through $CC_N$ 330. In addition, the UE 315 can transmit information to the eNodeB 305-*a* over reverse (uplink) channels 334-1 through 334-N on LTE component carriers $CC_1$ through $CC_N$. Similarly, the AP 305-*b* may transmit information to the UE 315 over forward (downlink) channel 352 on WLAN carrier 340. In addition, the UE 315 may transmit information to the AP 305-*b* over reverse (uplink) channel 354 of WLAN carrier 340. Although a single eNodeB 305-*a* is illustrated for carrier aggregation, it is understood that a similar operation may be implemented with multiple eNodeBs 305-*a* when the UE 315 is operating in multiple connectivity. For example, when a first eNodeB 305-*a* operates as an MeNB and a second eNodeB 305-*a* operates as an SeNB, dual connectivity carrier aggregation may be performed in connection with the UE 315.

In describing the various entities of FIG. 3, as well as other figures associated with some of the disclosed embodiments, for the purposes of explanation, the nomenclature associated with a 3GPP LTE or LTE-A wireless network is used. However, it is to be appreciated that the system 300 can operate in other networks such as, but not limited to, an OFDMA wireless network, a CDMA network, a 3GPP2 CDMA2000 network and the like.

In multi-carrier operations, the downlink control information (DCI) messages associated with different UEs 315 can be carried on multiple component carriers. For example, the DCI on a PDCCH can be included on the same component carrier that is configured to be used by a UE 315 for physical downlink shared channel (PDSCH) transmissions (i.e., same-carrier signaling). Alternatively, or additionally, the DCI may be carried on a component carrier different from the target component carrier used for PDSCH transmissions (i.e., cross-carrier signaling). In some implementations, a carrier indicator field (CIF), which may be semi-statically enabled, may be included in some or all DCI formats to facilitate the transmission of PDCCH control signaling from a carrier other than the target carrier for PDSCH transmissions (cross-carrier signaling).

In the present example, the UE 315 may receive data from one eNodeB 305-a. However, users on a cell edge may experience high inter-cell interference which may limit the data rates. Multiflow allows UEs to receive data from two eNodeBs 305-a simultaneously, as described above. In some aspects, the two eNodeBs 305-a may be non-collocated and may be configured to support multiple connectivity carrier aggregation. Multiflow works by sending and receiving data from the two eNodeBs 305-a in two totally separate streams when a UE is in range of two cell towers in two adjacent cells at the same time (see e.g., FIG. 5, which is described below). The UE may communicate with two eNodeB 305-a contemporaneously when the device is on the edge of either eNodeBs' reach. By scheduling two independent data streams to the mobile device from two different eNodeBs at the same time, multiflow exploits uneven loading in HSPA networks. This helps improve the cell edge user experience while increasing network capacity. In one example, throughput data speeds for users at a cell edge may double. In some aspects, multiflow may also refer to the ability of a UE to talk to a WWAN tower (e.g., cellular tower) and a WLAN tower (e.g., AP) simultaneously when the UE is within the reach of both towers. In such cases, the towers may be configured to support carrier aggregation through multiple connections when the towers are not collocated. Multiflow is a feature of LTE/LTE-A that is similar to dual-carrier HSPA, however, there are differences. For example, dual-carrier HSPA doesn't allow for connectivity to multiple towers to connect simultaneously to a device.

LTE-A standardization, LTE component carriers 330 have been backward-compatible, which enabled a smooth transition to new releases. However, this feature caused the LTE component carriers 330 to continuously transmit common reference signals (CRS, also referred to as cell-specific reference signals) in every subframe across the bandwidth. Most cell site energy consumption is caused by the power amplifier, as the cell remains on even when only limited control signaling is being transmitted, causing the amplifier to continue to consume energy. CRS were introduced in release 8 of LTE and are LTE's most basic downlink reference signal. The CRSs are transmitted in every resource block in the frequency domain and in every downlink subframe. CRS in a cell can be for one, two, or four corresponding antenna ports. CRS may be used by remote terminals to estimate channels for coherent demodulation. A New Carrier Type (NCT) allows temporarily switching off of cells by removing transmission of CRS in four out of five sub frames. This feature reduces power consumed by the power amplifier, as well as the overhead and interference from CRS, as the CRS is no longer continuously transmitted in every subframe across the bandwidth. In addition, the New Carrier Type allows the downlink control channels to be operated using UE-specific Demodulation Reference Symbols. The New Carrier Type might be operated as a kind of extension carrier along with another LTE/LTE-A carrier or alternatively as standalone non-backward compatible carrier.

Figure 4:
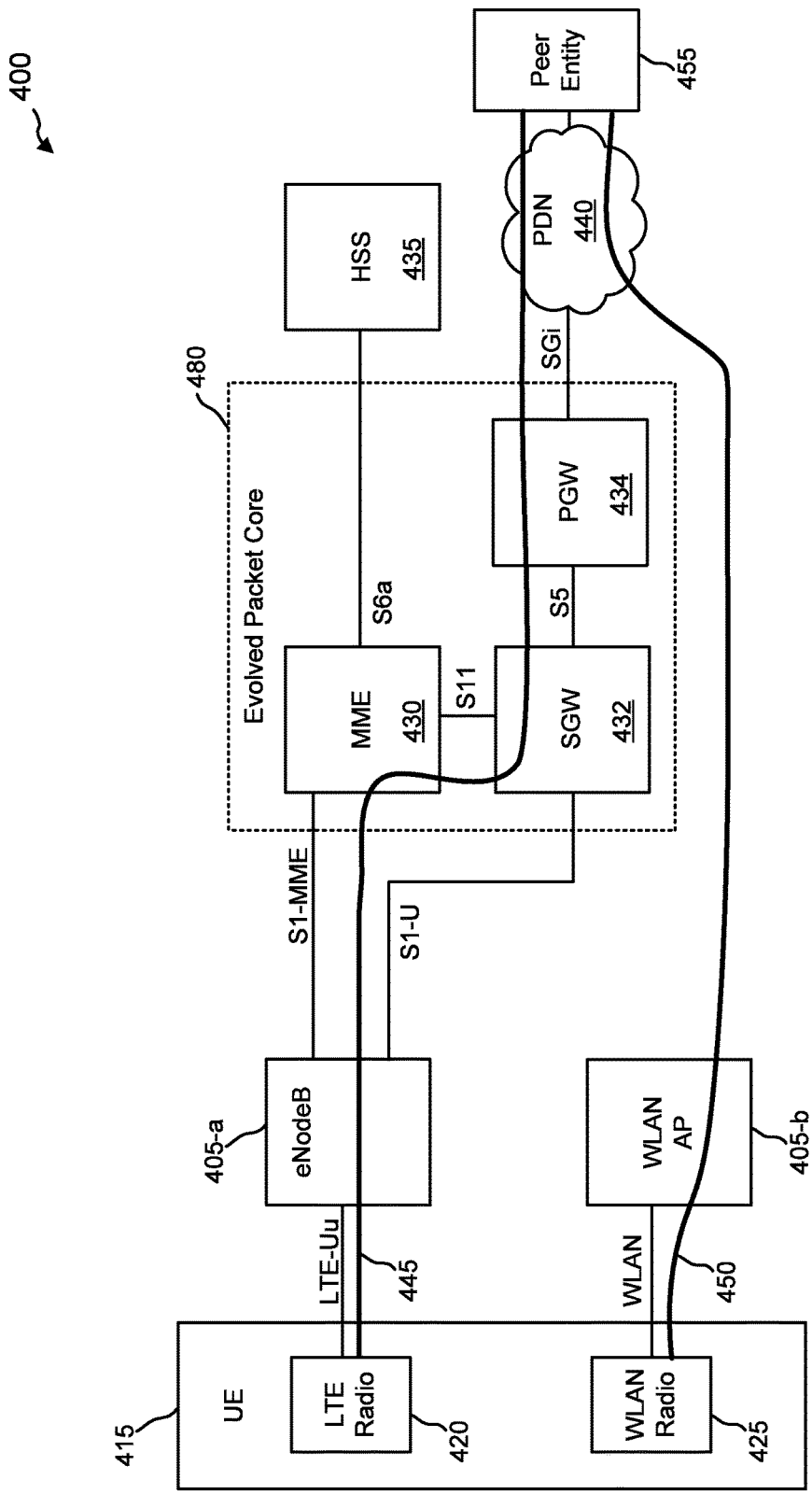
FIG. 4 is a block diagram conceptually illustrating an example of data paths between a UE and a packet data network (PDN), in accordance with an aspect of the present disclosure.

FIG. 4 is a block diagram conceptually illustrating an example of data paths 445 and 450 between a UE 415 and a PDN 440 (e.g., Internet) in accordance with an aspect of the present disclosure. The data paths 445, 450 are shown within the context of a wireless communications system 400 for aggregating data from different radio access technologies. The system 300 of FIG. 3 may be an example of portions of the wireless communications system 400. The wireless communications system 400 may include a multi-mode UE 415, an eNodeB 405-a, a WLAN AP 405-b, an evolved packet core (EPC) 480, a PDN 440, and a peer entity 455. The multi-mode UE 415 may be configured to support multiple connectivity (e.g., dual connectivity) carrier aggregation. The EPC 480 may include a mobility management entity (MME) 430, a serving gateway (SGW) 432, and a PDN gateway (PGW) 434. A home subscriber system (HSS) 435 may be communicatively coupled with the MME 430. The UE 415 may include an LTE radio 420 and a WLAN radio 425. In some implementations, the UE 415 may include a WWAN radio, of which the LTE radio 420 is an example, along with the WLAN radio 425, of which a Wi-Fi radio may be an example. Dual connectivity with carrier aggregation may be implemented in connection with the WWAN radio, the WLAN radio 425, or both. These elements may represent aspects of one or more of their counterparts described above with reference to the previous or subsequent Figures. For example, the UE 415 may be an example of UEs in FIG. 1, FIG. 2, FIG. 3, FIG. 5, FIG. 6, FIG. 7, and/or FIG. 8, the eNodeB 405-a may be an example of the eNodeBs/base stations of FIG. 1, FIG. 2, FIG. 3, FIG. 5, FIG. 6, FIG. 7, and/or FIG. 8, the AP 405-b may be an example of the AP 305-b of FIG. 3, and/or the EPC 480 may be an example of at least portions of the core network of FIG. 1 and/or FIG. 8. The eNodeB 405-a and AP 405-b in FIG. 4 may be not be collocated or otherwise may not be in high-speed communication with each other. On the other hand, although a single eNodeB 405-a is illustrated for carrier aggregation, it is understood that multiple connectivity with carrier aggregation may be implemented with multiple eNodeBs 405-a when the UE 415 is operating in multiple connectivity. For example, when a first eNodeB 405-a operates as an MeNB and a second eNodeB 405-a operates as an SeNB, dual connectivity carrier aggregation may be performed in connection with the UE 415. Aggregation may take place from cells of the same eNodeB or from cells of eNodeBs that are collocated or in high-speed communication with each other.

Referring back to FIG. 4, the eNodeB 405-a and the AP 405-b may be capable of providing the UE 415 with access to the PDN 440 using the aggregation of one or more LTE component carriers and/or one or more WLAN component carriers. Accordingly, the UE 415 may involve carrier aggregation in dual connectivity, where one connection is to one network entity (eNodeB 405-a) and the other connection is to a different network entity (AP 405-b). Using this access to the PDN 440, the UE 415 may communicate with the peer entity 455. The eNodeB 405-a may provide access to the PDN 440 through the evolved packet core 480 (e.g., through data path 445), and the WLAN AP 405-b may provide direct access to the PDN 440 (e.g., through data path 450).

The MME 430 may be the control node that processes the signaling between the UE 415 and the EPC 480. Generally, the MME 430 may provide bearer and connection management. The MME 430 may, therefore, be responsible for idle mode UE tracking and paging, bearer activation and deactivation, and SGW selection for the UE 415. The MME 430 may communicate with the eNodeB 405-a over an S1-MME interface. The MME 430 may additionally authenticate the UE 415 and implement Non-Access Stratum (NAS) signaling with the UE 415.

The HSS 435 may, among other functions, store subscriber data, manage roaming restrictions, manage accessible access point names (APNs) for a subscriber, and associate subscribers with MMEs 430. The HSS 435 may communicate with the MME 430 over an S6a interface defined by the Evolved Packet System (EPS) architecture standardized by the 3GPP organization.

All user IP packets transmitted over LTE may be transferred through eNodeB 405-a to the SGW 432, which may be connected to the PDN gateway 434 over an S5 signaling interface and the MME 430 over an S11 signaling interface. The SGW 432 may reside in the user plane and act as a mobility anchor for inter-eNodeB handovers and handovers between different access technologies. The PDN gateway 435 may provide UE IP address allocation as well as other functions.

The PDN gateway (PGW) 434 may provide connectivity to one or more external packet data networks, such as PDN 440, over an SGi signaling interface. The PDN 440 may include the Internet, an Intranet, an IP Multimedia Subsystem (IMS), a Packet-Switched (PS) Streaming Service (PSS), and/or other types of PDNs.

In the present example, user plane data between the UE 415 and the EPC 480 may traverse the same set of one or more EPS bearers, irrespective of whether the traffic flows over path 445 of the LTE link or path 450 of the WLAN link. Signaling or control plane data related to the set of one or more EPS bearers may be transmitted between the LTE radio 420 of the UE 415 and the MME 430 of the EPC 480, by way of the eNodeB 405-a.

While aspects of FIG. 4 have been described with respect to LTE, similar aspects regarding aggregation and/or multiple connections may also be implemented with respect to UMTS or other similar system or network wireless communications radio technologies. Moreover, while aspects of carrier aggregation have been described in FIG. 3 and FIG. 4 with respect to an eNodeB and a WLAN AP, a similar approach may be used when two or more eNodeBs are used in a multiple connectivity carrier aggregation scenario, or when two or more cells from a same eNodeB are used in a multiple connectivity carrier aggregation scenario, as described above. Aggregation may take place from cells of the same eNodeB or from cells of eNodeBs that are collocated or in high-speed communication with each other.

Figure 5:
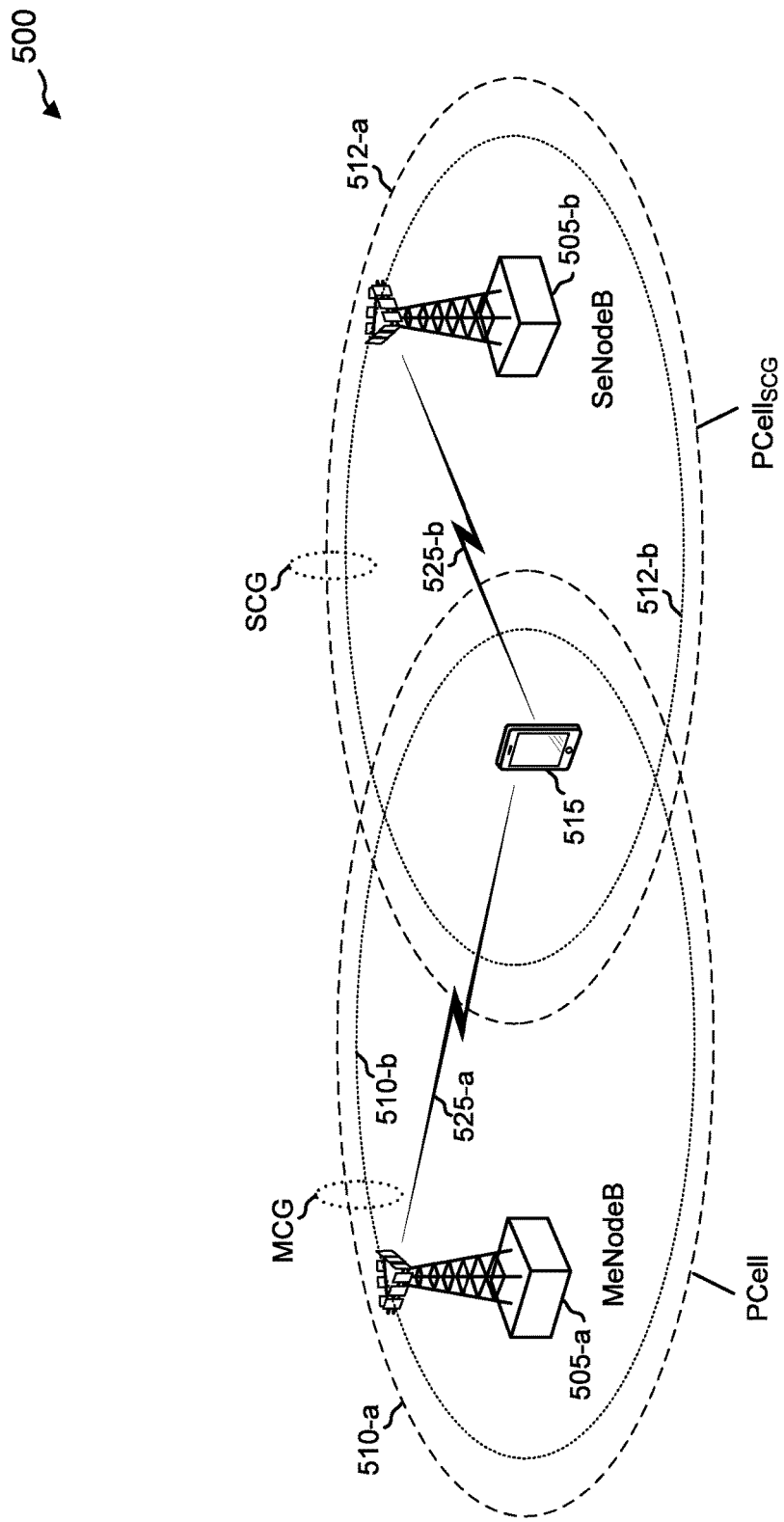
FIG. 5 is a diagram conceptually illustrating multiple connectivity carrier aggregation, in accordance with an aspect of the present disclosure.

FIG. 5 is a diagram conceptually illustrating multiple connectivity carrier aggregation in accordance with an aspect of the present disclosure. A wireless communications system 500 may include a master eNodeB 505-a (MeNodeB or MeNB) having a set or group of cells referred to as a master cell group or MCG that may be configured to serve the UE 515. The MCG may include one primary cell (PCell) 510-a and one or more secondary cells 510-b (only one is shown in FIG. 5 for illustration). The wireless communications system 500 may also include a secondary eNodeB 505-b (SeNodeB or SeNB) having a set or group of cells referred to as a secondary cell group or SCG that may be configured to serve the UE 515. The SCG may include one primary cell (PCell$_{SCG}$) 512-a and one or more secondary cells 512-b (only one is shown in FIG. 5 for illustration). Also shown is a UE 515 that supports carrier aggregation for multiple connectivity (e.g., dual connectivity) scenarios. The UE 515 may communicate with the MeNodeB 505-a via communication link 525-a and with the SeNodeB 505-b via communication link 525-b.

In one implementation, the UE 515 may aggregate component carriers from the same eNodeB or may aggregate component carriers from collocated eNodeBs. In such an example, the various cells (e.g., different component carriers (CCs)) being used can be easily coordinated because they are either handled by the same eNodeB or by eNodeBs that can quickly communicate control information. When the UE 515, as in the example of FIG. 5, performs carrier aggregation when in communication with two eNodeBs that are non-collocated, then the carrier aggregation operation may be different due to various network conditions. In this case, establishing a primary cell (PCell$_{SCG}$) in the secondary eNodeB 505-b may allow for appropriate configurations and controls to take place at the UE 515 even though the secondary eNodeB 505-b is non-collocated with the primary eNodeB 505-a.

In the example of FIG. 5, the carrier aggregation may involve certain functionalities by the PCell of the MeNodeB 505-a. For example, the PCell may handle certain functionalities such as physical uplink control channel (PUCCH), contention-based random access control channel (RACH), and semi-persistent scheduling to name a few. Carrier aggregation with dual or multiple connectivity to non-collocated eNodeBs may involve having to make some enhancements and/or modifications to the manner in which carrier aggregation is otherwise performed. Some of the enhancements and/or modifications may involve having the UE 515 connected to the MeNodeB 505-a and to the SeNodeB 505-b as described above. Other features may include, for example, having a timing advance group (TAG) comprise cells of one of the eNodeBs, having contention-based and contention-free random access (RA) allowed on the SeNodeB 505-b, separate discontinuous reception (DRX) procedures for the MeNodeB 505-a and to the SeNodeB 505-b, having the UE 515 send a buffer status report (BSR) to the eNodeB where the bearer is served, as well as enabling one or more of power headroom report (PHR), power control, semi-persistent scheduling (SPS), and logical channel prioritization in connection with the PCell$_{SCG}$ in the secondary eNodeB 505-b. The enhancements and/or modifications described above, as well as others provided in the disclosure, are intended for purposes of illustration and not of limitation.

For carrier aggregation in dual connectivity as in the example of FIG. 5, different functionalities may be divided between the MeNodeB 505-a and the SeNodeB 505-b. For example, different functionalities may be statically divided between the MeNodeB 505-a and the SeNodeB 505-b, or dynamically divided between the MeNodeB 505-a and the SeNodeB 505-b based on one or more network parameters. In an example, the MeNodeB 505-a may perform upper layer (e.g., layers above the media access control (MAC) layer) functionalities via a PCell, such as but not limited to functionalities related to initial configuration, security, system information, and/or radio link failure (RLF). As described in the example of FIG. 5, the PCell may be configured as one of the cells of the MeNodeB 505-a that belongs to the MCG. The PCell may be configured to provide lower layer functionalities (e.g., MAC/PHY layer) within the MCG.

In an example, the SeNodeB 505-b may provide configuration information of lower layer (e.g., PHY/MAC layers) functionalities for the SCG. The configuration information may be provided by the PCell$_{SCG}$ as one or more radio resource control (RRC) messages, for example. The PCell$_{SCG}$ may include both uplink and downlink carriers, and may provide PCell-like lower layer functionality for the SCG. The PCell$_{SCG}$ may be configured to have the lowest cell index (e.g., identifier or ID) among the cells in the SCG. For example, some of the functionalities performed by the SeNodeB 505-b via the PCell$_{SCG}$ may include carrying the PUCCH, configuring the cells in the SCG to follow the DRX configuration of the PCell$_{SCG}$, configure resources for contention-based and contention-free random access on the SeNodeB 505-*b*, carrying downlink (DL) grants having transmit power control (TPC) commands for PUCCH, estimating pathloss based on PCell$_{SCG}$ for other cells in the SCG, providing common search space for the SCG, and providing SPS configuration information for the UE 515.

In some aspects, the PCell may be configured to provide upper level functionalities to the UE 515 such as security, connection to a network, initial connection, and/or radio link failure, for example. The PCell may be configured to carry physical uplink control channel (PUCCH) for cells in the MCG, to include the lowest cell index among the MCG, to enable the MCG cells to have the same discontinuous reception (DRX) configuration, to configure random access resources for one or both of contention-based and contention-free random access on the MeNodeB 505-*a*, to enable downlink grants to convey transmit power control (TPC) commands for PUCCH, to enable pathloss estimation for cells in the MCG, to configure common search space for the MeNodeB 505-*a*, and/or to configure semi-persistent scheduling.

In some aspects, the PCell$_{SCG}$ may be configured to carry PUCCH for cells in the SCG, to include the lowest cell index among the SCG, to enable the SCG cells to have the same DRX configuration, to configure random access resources for one or both of contention-based and contention-free random access on the SeNodeB 505-*b*, to enable downlink grants to convey TPC commands for PUCCH, to enable pathloss estimation for cells in the SCG, to configure common search space for the SeNodeB 505-*b*, and/or to configure semi-persistent scheduling.

Returning to the example of FIG. 5, the UE 515 may support parallel PUCCH and physical uplink shared channel (PUSCH) configurations for the MeNodeB 505-*a* and the SeNodeB 505-*b*. In some cases, the UE 515 may use a configuration (e.g., UE-based) that may be applicable to carrier groups from both eNodeBs. These PUCCH/PUSCH configurations may be provided through RRC messages, for example.

The UE 515 may also support parallel configuration for simultaneous transmission of acknowledgement (ACK)/negative acknowledgement (NACK) and channel quality indicator (CQI) and for ACK/NACK/SRS for the MeNodeB 505-*a* and the SeNodeB 505-*b*. In some cases, the UE 515 may use a configuration (e.g., UE-based and/or MCG- or SCG-based) that may be applicable to carrier groups from both eNodeBs. These configurations may be provided through RRC messages, for example.

In another aspect of communications system 500, cross-carrier control can be configured such that one cell may convey control for another cell. One possible exception may be that an SCell may not cross-carrier control a PCell. For dual connectivity, for example, cross-carrier control may be configured within the cell belonging to the same carrier group. In such a scenario, the exception that SCells may not be able to cross-carrier control PCell and PCell$_{SCG}$ may be preserved.

Figure 6:
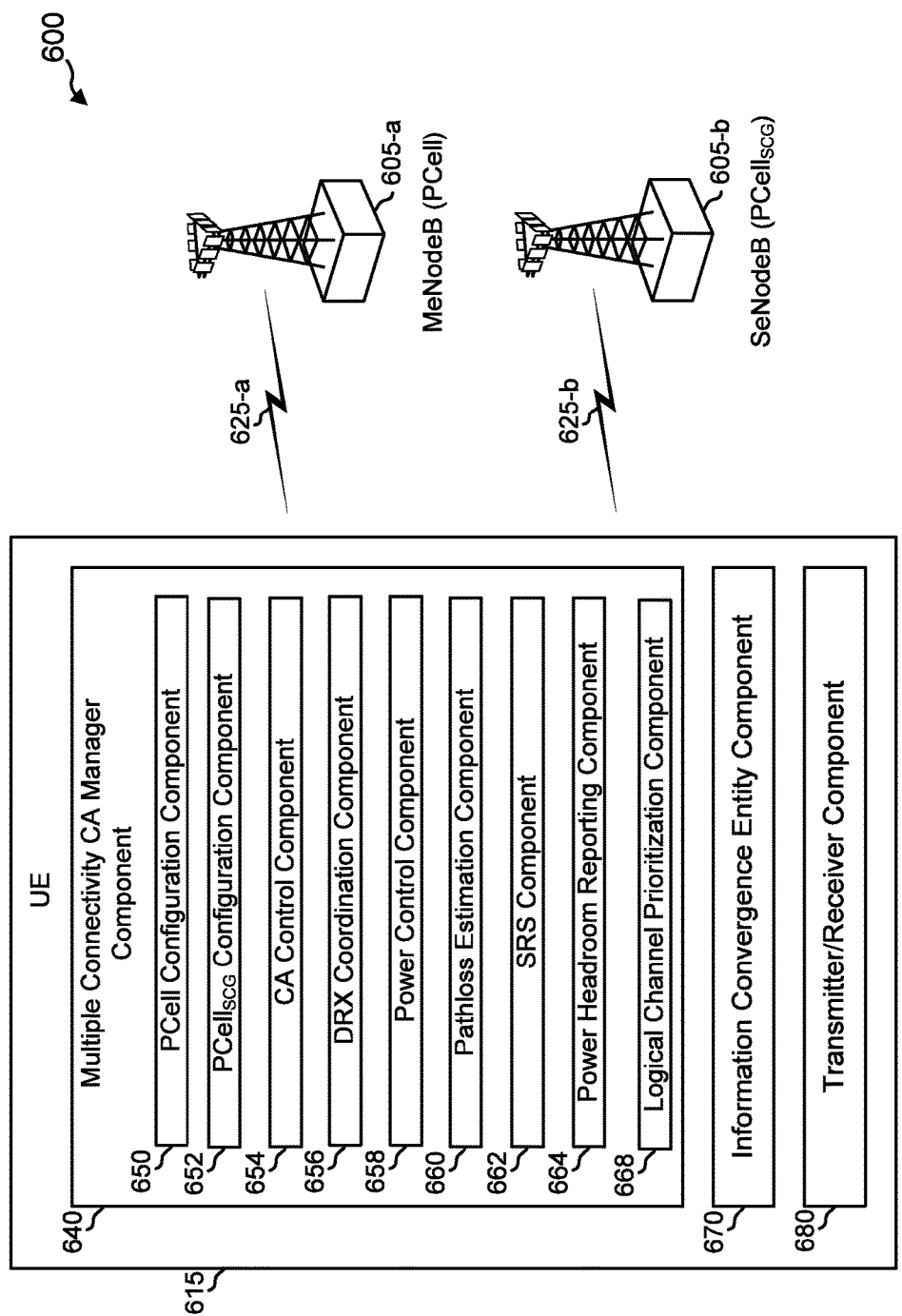
FIG. 6 is a block diagram conceptually illustrating an example of a UE having configured components, in accordance with an aspect of the present disclosure.

FIG. 6 is a block diagram 600 conceptually illustrating an example of a UE 615 having configured components in accordance with an aspect of the present disclosure. In an aspect, the term "component" as used herein may be one of the parts that make up a system, may be hardware or software, and may be divided into other components. A base station/eNodeB 605-*a* (MeNodeB with a PCell), a station/eNodeB 605-*b* (SeNodeB with a PCell$_{SCG}$), and the UE 615 of diagram 600 may be one of the base stations/eNodeBs (or APs) and UEs as described in various Figures. The MeNodeB 605-*a* and the UE 615 may communicate over communications link 625-*a*. The SeNodeB 605-*b* and the UE 615 may communicate over communications link 625-*b*. Each of the communications links 625-*a*, 625-*b* may be an example of the communications links 125 of FIG. 1.

The UE 615 may include a multiple connectivity carrier aggregation (CA) manager component 640, an information convergence entity component 670, and a transmitter/receiver component 680. The multiple connectivity CA manager component 640 may be configured to receive configuration information to communicate with the SeNodeB 605-*b* through the PCell$_{SCG}$, and to receive configuration information to communicate with the MeNodeB 605-*a* through the PCell, where the SeNodeB 605-*b* is non-collocated with the MeNodeB 605-*a*. In some aspect, the configuration information may be received via the transmitter/receiver component 680.

The information convergence entity component 670 may be configured to aggregate information (e.g., configuration information, control information, and/or load data) received from the SeNodeB 605-*b* and the MeNodeB 605-*a* when the UE 615 is in concurrent communication with the SeNodeB 605-*b* and the MeNodeB 605-*a*. The information convergence entity component 670 may be one of a packet data convergence protocol (PDCP) entity, an internet protocol (IP) entity, and an RRC entity.

The multiple connectivity CA manager component 640 may include a PCell configuration component 650, a PCell$_{SCG}$ configuration component 652, a CA control component 654, a DRX coordination component 656, a power control component 658, a pathloss estimation component 660, an SRS component 662, a power headroom reporting component 664, and a logical channel prioritization component 668.

The PCell configuration component 650 may be configured to handle various aspects described herein for receiving and/or processing configuration information provided by the PCell of the MeNodeB 605-*a*.

The PCell$_{SCG}$ configuration component 652 may be configured to handle various aspects described herein for receiving and/or processing configuration information provided by the PCell$_{SCG}$ of the SeNodeB 605-*b*.

The CA control component 654 may be configured to handle various aspects described herein for cross-carrier controls and controlling transmission of uplink control information (UCI) over PUCCH or PUSCH in multiple connectivity carrier aggregation.

The DRX coordination component 656 may be configured to handle various aspects described herein for coordinating DRX procedures with the MeNodeB 605-*a* and the SeNodeB 605-*b* in multiple connectivity carrier aggregation.

The power control component 658 may be configured to handle various aspects described herein for processing and/or using transmit power control (TCP) commands in multiple connectivity carrier aggregation.

The pathloss estimation component 660 may be configured to handle various aspects described herein for estimating or determining the pathloss of a cell in either the MeNodeB 605-*a* and the SeNodeB 605-*b* based at least in part on the downlink component carrier of the particular cell or the primary component carrier.

The SRS component 662 may be configured to handle various aspects described herein for processing and/or configuring the sounding reference signal of each serving cell in multiple connectivity carrier aggregation.

The power headroom reporting component 664 may be configured to handle various aspects described herein for implementing power headroom reporting in multiple connectivity carrier aggregation.

The logical channel prioritization component 668 may be configured to handle various aspects described herein for processing and/or configuring logical channel (LC) prioritization in multiple connectivity carrier aggregation.

With respect to the CA control component 654, the UE 615 can be connected to different nodes (e.g., the MeNodeB 605-a and the SeNodeB 605-b) using different carrier frequencies. Each node (e.g., the MeNodeB 605-a or the SeNodeB 605-b) may configure a group of cells (e.g., the MCG and the SCG) for serving the UE 615. The cells (e.g., component carriers) within each group may be configured to cross control other cells within the group. In an example, a secondary cell of a group may not cross control the primary cell of the group. The CA control component 654 may receive cross-carrier control information for the MCG and the SCG from the MeNodeB 505-a and the SeNodeB 505-b, respectively. The PUCCH for the UE 615 may be configured on an uplink component carrier for each of the MeNodeB 605-a and the SeNodeB 605-b. PUCCH on one of the component carriers for both the MCG associated with MeNodeB 605-a and the SCG associated with SeNodeB 605-b may carry UCI for all the component carriers associated with the respective group of cells. In this case, RRC configuration messages may be used to indicate or specify which component carrier from the MCG and which component carrier from the SCG carries PUCCH. For example, the PUCCH for the MeNodeB 505-a may be carried on the PCell (e.g., PCell component carrier) of the MCG and PUCCH for the SeNodeB 505-b may be carried on the $PCell_{SCG}$ (e.g., $PCell_{SCG}$ component carrier) of the SCG.

With respect to the CA control component 654, when UCI is transmitted on PUSCH, the component carrier of MCG and SCG with the smallest cell index (within its corresponding group of cells) may be used to transmit PUSCH carrying the UCI for the corresponding group of cells.

With respect to the CA control component 654, the PUCCH format for ACK/NACK feedback for each of MCG and SCG may be determined based at least in part on the number of component carriers in each group of cells. For example, PUCCH format 1b with channel selection may be used when a group of cells has two (2) component carriers. In another example, PUCCH format 3 may be used when a group of cells has two (2) or more component carriers (or non-CA time division duplexing (TDD)).

With respect to the DRX coordination component 656, separate DRX configurations and/or procedures may be used for the MeNodeB 605-a and the SeNodeB 605-b. For example, cells (or component carriers) aggregated within each group (MCG and SCG) may follow the same DRX configuration, as in carrier aggregation. In some cases, the same DRX operation may be applied to all serving cells. The DRX coordination component 656 may also coordinate DRX for dual (or multiple) connectivity. For example, in some aggregation (e.g., packet aggregation) schemes, the DRX coordination component 656 may be used when the DRX among the MeNodeB 625-a and the SeNodeB 605-b is to be coordinated. In some cases, the same DRX configuration (as configured for PCell of the MeNodeB 605-a) may be applied on all cells when aggregation is configured. In some cases, the SeNodeB DRX configuration (e.g., DRX configuration for the SeNodeB) may be a superset of the MeNodeB DRX configuration (e.g., DRX configuration for the MeNodeB). For example, the SeNodeB DRX configuration may be a superset with respect to the subframes used for DRX. In another example, the SeNodeB DRX configuration may be a superset as configured for $PCell_{SCG}$, when the concept of a $PCell_{SCG}$ is used with the SeNodeB 605-b.

With respect to the power control component 658, in carrier aggregation, power control may be implemented separately for PUCCH and PUSCH for each carrier component. For example, TPC commands in carrier aggregation may be provided on a downlink grant downlink control information (DCI) of the PCell for PUCCH power control, and TPC commands may be provided in an uplink grant DCI of the corresponding cell for PUSCH power control.

For multiple connectivity, a downlink grant of $PCell_{SCG}$ may convey TPC commands since the $PCell_{SCG}$ has PUCCH configured on the uplink. In such instances, PUCCH format 3 resource allocation may be used to denote one of several (e.g., four) possible values configured by higher layers. When $PCell_{SCG}$ is the only cell in SCG, PUCCH format 3 resource allocation may not be conveyed and, therefore, PUCCH format 3 may not be available in such situations. This may be fine because PUCCH format 3 is generally intended for carrier aggregation and larger ACK/NACK (A/N) payload.

The power control component 658 may support power scaling and prioritization when the UE 615 is power limited. In such scenarios, carrier aggregation principles may be utilized. For example, PUCCHs may be prioritized over other channels. The power control component 658 may determine whether to give higher priority to PUCCH on the PCell over PUCCH on the $PCell_{SCG}$, or scale uniformly across PUCCHS. In another example, PUSCHs carrying UCI may be prioritized. The power control component 658 may determine whether to give higher priority to PUSCH with UCI on the PCell over PUSCH with UCI on the $PCell_{SCG}$, or scale uniformly across PUSCHs with UCI. In yet another example, prioritization may occur among PUSCHs on component carriers in MSG and SCG. The power control component 658 may prioritize among PUSCHs on component carriers in MSG and SCG by, for example, giving the higher priority to the MSG PUSCHs or scaling uniformly across all PUSCHs.

With respect to the pathloss estimation component 660, in carrier aggregation, the pathloss estimation of a cell may be performed either based on the corresponding downlink component carrier of the given cell or on the primary cell (e.g., PCell or $PCell_{SCG}$). The choice may be based on which TAG is associated with the serving cell. The same or similar mechanism may be used for dual connectivity. For example, the pathloss estimation may be based on $PCell_{SCG}$ for the cells in SCG.

With respect to the SRS component 662, the SRS in carrier aggregation may be configured for each serving cell. For example, the UE 615 may be configured with SRS parameters for trigger type 0 (periodic) and trigger type 1 (aperiodic) on each serving cell. The SRS parameters may be serving cell specific and semi-statically configurable by higher layers. These carrier aggregation principles may also be used for dual connectivity.

With respect to the power headroom reporting component 664, two types of power headroom may be supported: Type 1, for which power headroom (PH)=Pcmax,c−PUSCH_tx_pwr, and type 2, for which PH=Pcmax,c−PUCCH_tx_pwr−PUSCH_tx_pwr, where Pcmax,c is the nominal UE maximum transmit power, PUSCH_tx_pwr is the estimated PUSCH transmit power, and PUCCH_tx_pwr is the estimated PUCCH transmit power. Type 1 may apply to both PCells and SCells. Type 2 may apply to PCells and PUCCH and PUSCH simultaneous transmission. In the context of multiflow (e.g., aggregation), for the case of PUCCH on SCell, Type 2 may apply to the SCell as well. For example, RRC may be used to configure the UE 615 SCell to transmit/receive (Tx/Rx) Type 2 power headroom and the SCell to perform scheduling taking into account information provided in a report.

In case of multiple PUCCHs/PUSCHs on a single component carrier, the PH formula may be adjusted to take into account additional channels. For example, for Type 1, PH=Pcmax,c−(PUSCH_tx_pwr_1+PUSCH_txp_wr_2+ . . . ), and for Type 2, PH=Pcmax,c−(PUCCH_tx_pwr_1+ PUCCH_tx_pwr_2+ . . . )−(PUSCH_tx_pwr_1+PUSCH_ tx_pwr_2+ . . . ). In this example, PUSCH_tx_pwr_ 1 may refer to the transmit power estimate for a first PUSCH and PUSCH_tx_power_2 may refer to the transmit power estimate for a second PUSCH. Similarly, PUCCH_tx_pwr_ 1 may refer to the transmit power estimate for a first PUCCH and PUCCH_tx_power_2 may refer to the transmit power estimate for a second PUCCH.

With respect to the logical channel prioritization component 668, packet (e.g., data packet) building across component carriers may depend on various aspects. For example, when the UE 615 is provided with valid uplink grants in several serving cells in one subframe, the order in which the grants are processed during logical channel prioritization and whether joint or serial processing is applied may be decided by the logical channel prioritization component 668 in the UE 615. There may not be a mapping between logical channel traffic and SPS or dynamic grant. For example, data from any logical channel may be sent on any granted PUSCH resources (SPS or dynamic).

The same approach as described above for logical channel prioritization ma be used for dual connectivity with packet aggregation. For example, the buffer status report (BSR) logical channel ID (LCID) coefficients may be signaled and used for logical channel payload-to-grant mapping. In the case of dual connectivity for bearer aggregation, logical channels may be mapped to specific uplink grants. For example, logical channels corresponding to bearers configured on the MeNodeB 605-*a* are to be mapped to the uplink grants received on component carriers of the MCG. Similarly, logical channels corresponding to bearers configured on the SeNodeB 605-*b* are to be mapped to the uplink grants received on component carriers of the SCG.

Figure 7:
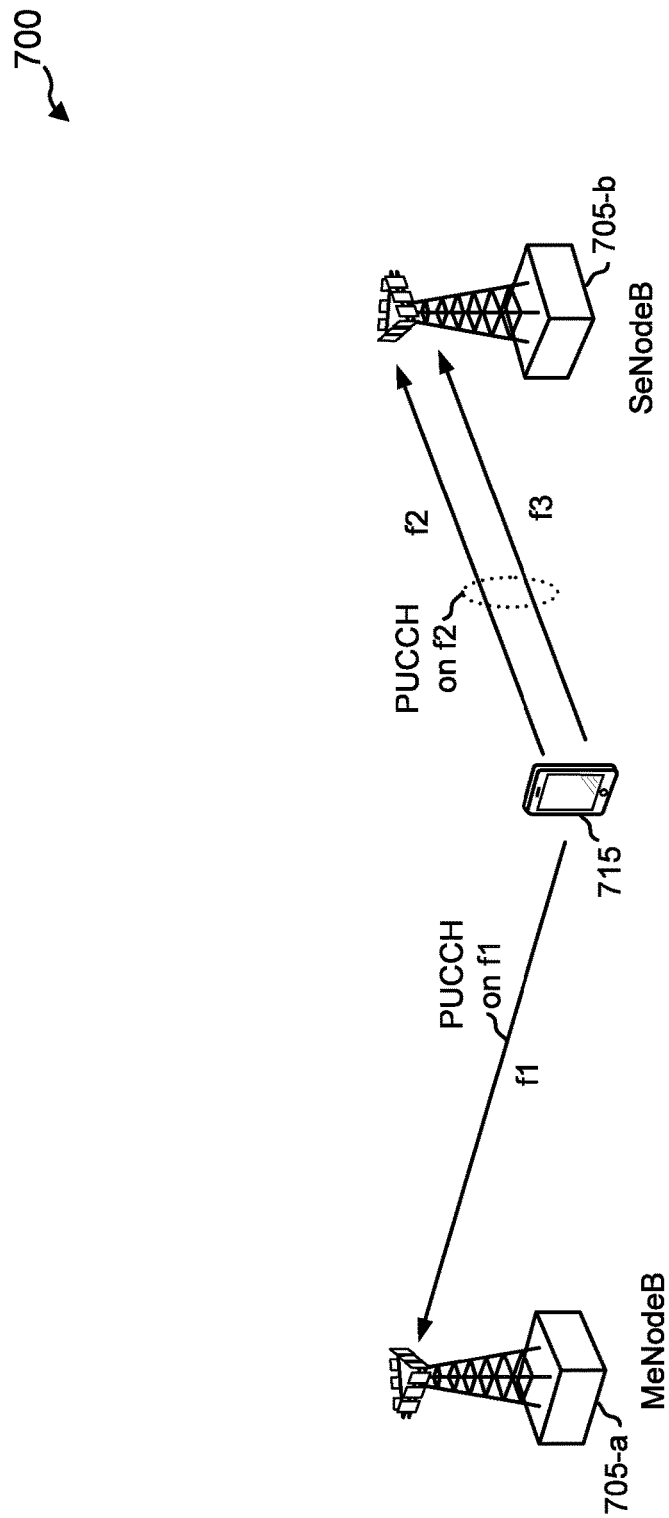
FIG. 7 is a diagram conceptually illustrating an example of carrier aggregation within the nodes in dual connectivity, in accordance with an aspect of the present disclosure.

FIG. 7 is a diagram conceptually illustrating an example of carrier aggregation within the nodes in dual connectivity in accordance with an aspect of the present disclosure. The wireless communications network 700 shows an example of carrier aggregation in connection with the multiple connectivity CA manager component 640 and/or the CA control component 654 of FIG. 6. In particular, wireless communications network 700 shows an example of controlling transmission of uplink control information over PUCCH in dual-connectivity carrier aggregation. In this example, a UE 715 is connected with different nodes using different carrier frequencies. The same carrier aggregation principles used with one node may also be used with the other node. In this example, a master eNodeB 705-*a* (MeNodeB or MeNB) and a secondary eNodeB 705-*b* (SeNodeB or SeNB) are shown in communication with the UE 715. The MeNodeB 705-*a*, the SeNodeB 705-*b*, and the UE 715 may be one of the base stations/eNodeBs and UEs as described in various Figures. For example, the UE 715 may correspond to the UE 615 of FIG. 6. In the example illustrated in FIG. 7, there is a single uplink component carrier (f1) being used between the UE 715 and the MeNodeB 705-*a*, and there are two uplink component carriers (f2 and f3) being used between the UE 715 and the SeNodeB 705-*b*. The PUCCH for the MeNodeB 705-*a* may be carried on component carrier (f1) and the PUCCH for the SeNodeB 705-*b* may be carried on component carrier (f2), which is the cell with the smallest cell index within the SCG for SeNodeB 705-*b*. For example, the component carrier (f2) may be configured as the $PCell_{SCG}$.

Returning to the wireless communications network 700 of FIG. 7, and as noted above, one PUCCH may be configured for the UE 715 on an uplink component carrier for each of the MeNodeB 705-*a* and the SeNodeB 705-*b*. PUCCH on one of the component carriers from both MCG (associated with MeNodeB 705-*a*) and SCG (associated with SeNodeB 705-*b*) carriers uplink carrier information (UCI) for all the component carriers associated within the cell group. RRC configuration may be used to specify which component carrier (or cell) from MCG and which component carrier (or cell) from SCG carriers the PUCCH for the respective cell group. In one implementation, when the PCell for UE 715 is on the MeNodeB 705-*a* and the $PCell_{SCG}$ is on the SeNodeB 705-*b*, then PUCCH for MeNodeB/MCG is on PCell and PUCCH for SeNodeB/SCG is on $PCell_{SCG}$.

In yet another aspect of the wireless communications network 700, if UCI is to be transmitted on PUSCH instead of PUCCH, the component carrier from each of the MCG associated with the MeNodeB 705-*a* and the SCG associated with the SeNodeB 705-*b* having the smallest cell index (e.g., cell index of "0") within the respective cell group that transmits the PUSCH may be used to carry the UCI for the corresponding cell group.

In yet another aspect of the wireless communications network 700, the PUCCH format for ACK/NACK feedback for each group (e.g., MCG associated with MeNodeB 705-*a*, SCG associated with SeNodeB 705-*b*) is determined based on the number of component carriers in a group instead of being based on the total number of component carriers. For example, PUCCH format 1b with channel selection may be used when a group of cells includes two (2) component carriers, while PUCCH format 3 may be used when a group of cells includes two (2) or more component carriers (or non-carrier aggregation (CA) time division duplexing (TDD)).

Figure 8:
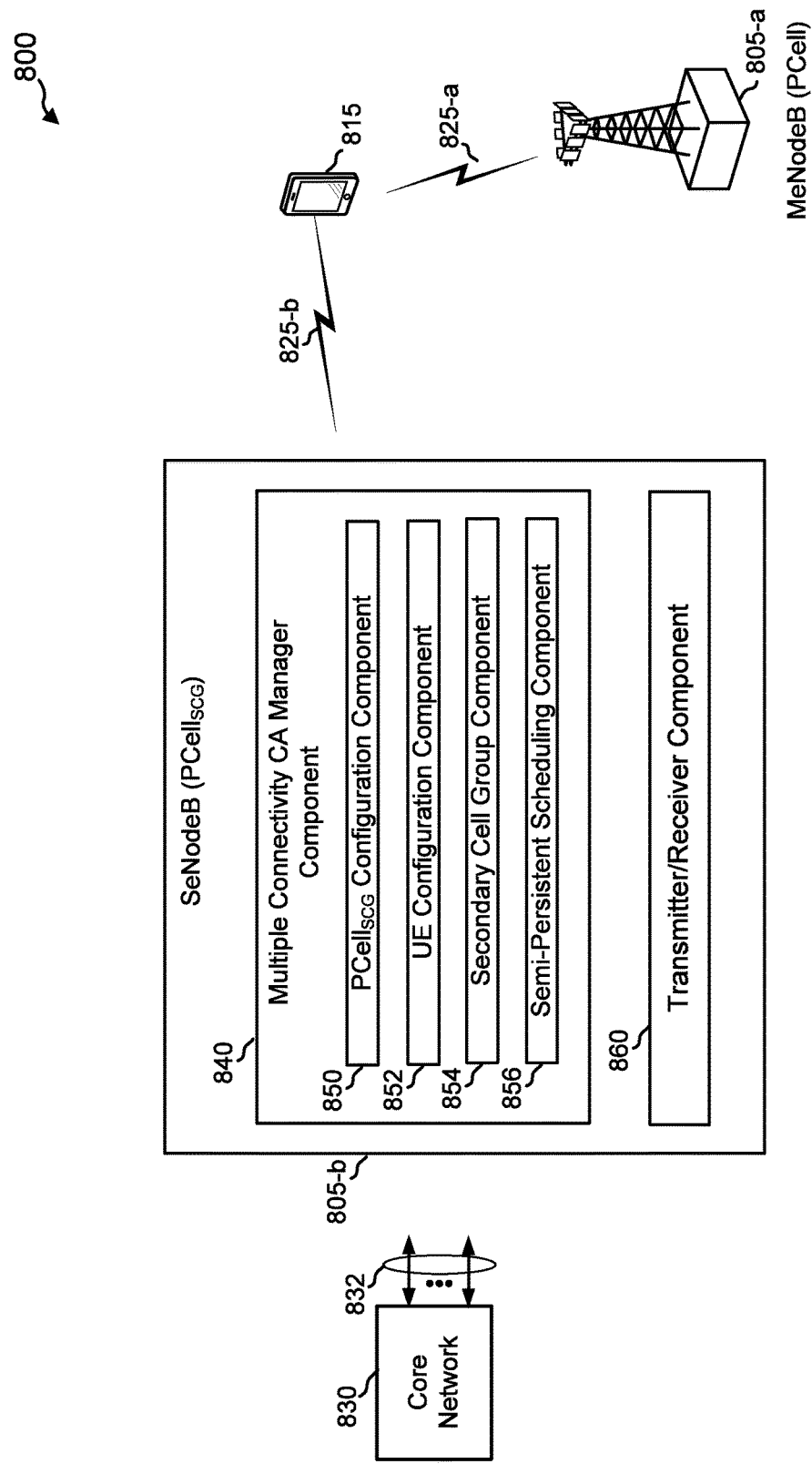
FIG. 8 is a block diagram conceptually illustrating an example of a secondary eNodeB having configured components, in accordance with an aspect of the present disclosure.

FIG. 8 is a block diagram conceptually illustrating an example of a secondary eNodeB 805-*b* (SeNodeB or SeNB) having configured components in accordance with an aspect of the present disclosure. A UE 815, a core network 830 (with backhaul links 832), a MeNodeB 805-*a*, and the SeNodeB 805-*b* of diagram 800 may be one of the UEs, core networks, and base stations/eNodeBs as described in various Figures. For example, the UE 815 may correspond to the UE 615 of FIG. 6 or the UE 715 of FIG. 7. The SeNodeB 805-*b* and the UE 815 may communicate over communications link 825-*b*, and the MeNodeB 805-*a* and the UE 815 may communicate over communication link 825-*a*. Communication links 825-*a* and 825-*b* may be an examples of the communications links 125 of FIG. 1. The SeNodeB 805-*b* may communicate with other network entities (e.g., base stations/eNodeBs) through the core network 830.

The SeNodeB 805-*b* may include a multiple connectivity CA manager component 840 and a transmitter/receiver component 860. The multiple connectivity CA manager component 840 may configure the SeNodeB 805-*b* to operate a group of cells (SCG) of the SeNodeB 805-*b* and one cell of the group of cells may be configured as a $PCell_{SCG}$. The multiple connectivity CA manager component 840 may be configured to transmit, to the UE 815, configuration information through the $PCell_{SCG}$ for the UE 815 to communicate with the SeNodeB 805-*b* while in concurrent communication with the MeNodeB 805-*a*, and where the SeNodeB 805-*b* is non-collocated with the MeNodeB 805-*a*. The transmission of the configuration information to the UE 815 may be performed at least in part by the transmitter/receiver component 860.

The multiple connectivity CA manager component 840 may include a $PCell_{SCG}$ configuration component 850, a UE configuration component 852, a secondary master group component 854, and a semi-persistent scheduling component 856.

The $PCell_{SCG}$ configuration component 850 may be configured to handle various aspects described herein for configuring one of the cells in the SCG of the SeNodeB 805-*b* to operate as a $PCell_{SCG}$.

The UE configuration component 852 may be configured to handle various aspects described herein for determining, processing, and/or transmitting configuration information to the UE 815. The UE configuration component 852 may also handle aspects of receiving uplink control information from the UE 815 over PUCCH.

The secondary cell group component 854 may be configured to handle various aspects described herein for managing the secondary cells of the SCG. For example the secondary cell group component 854 may perform cross-carrier control where one cell may convey control for another cell. The secondary cells of the SCG may not be able to cross-carrier control the $PCell_{SCG}$. In multiple connectivity carrier aggregation, cross-carrier control may be performed within those cells that belong to the same carrier group.

The semi-persistent scheduling component 856 may be configured to handle various aspects described herein for configuring semi-persistent scheduling on the $PCell_{SCG}$. For example, for dual connectivity, it may be desirable to allow SPS on the $PCell_{SCG}$. Semi-persistent scheduling or SPS may provide additional flexibility in operation. For example, in bearer aggregation, bearers suitable for semi-persistent scheduling may be configured on both the SeNodeB 805-*b* and the MeNodeB 805-*a*. In packet aggregation, a packet of a bearer suitable for semi-persistent scheduling transmission may be routed to both the SeNodeB 805-*b* and the MeNodeB 805-*a*.

The components and/or subcomponents described above with respect to FIG. 6 and FIG. 8 may be implemented in software, hardware, or a combination of software and hardware. Moreover, at least part of the functions of two or more of the components and/or subcomponents may be combined into a single component or single subcomponent and/or at least part of the function(s) of one component or subcomponent may be distributed among multiple components and/or subcomponents. The components and/or subcomponents of a single device (e.g., UE 615) may be in communication with one or more components and/or subcomponents of the same device.

Figure 9:
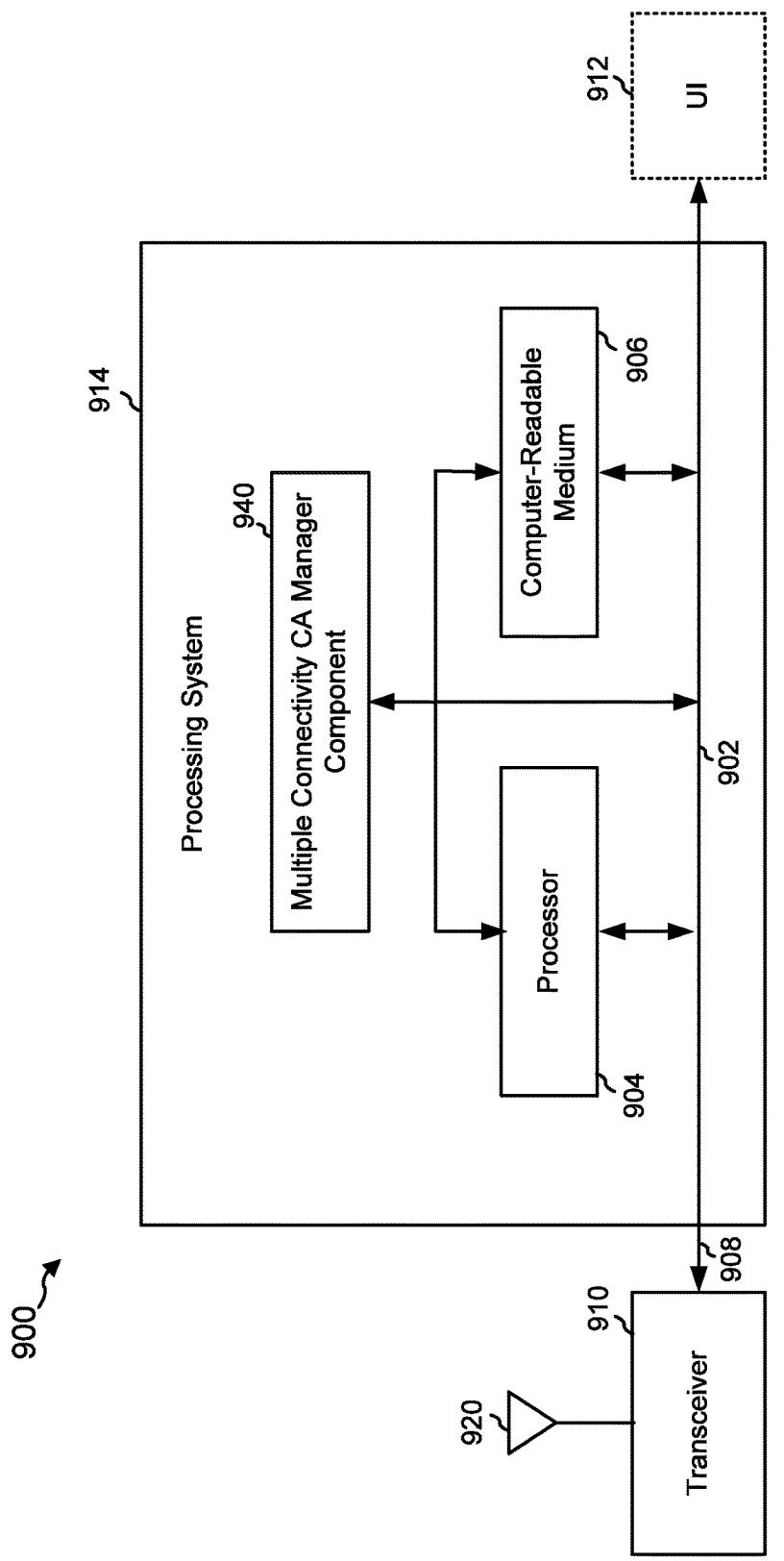
FIG. 9 is a block diagram conceptually illustrating an example hardware implementation for an apparatus employing a processing system, in accordance with an aspect of the present disclosure.

FIG. 9 is a block diagram conceptually illustrating an example hardware implementation for an apparatus 900 employing a processing system 914 in accordance with an aspect of the present disclosure. The processing system 914 includes a multiple connectivity CA manager component 940. In one example, the apparatus 900 may be the same or similar, or may be included with one of the eNodeBs described in various Figures. In such example, the multiple connectivity CA manager component 940 may correspond to, for example, the multiple connectivity CA manager component 840. In another example, the apparatus 900 may be the same or similar, or may be included with one of the UEs described in various Figures. In such example, the multiple connectivity CA manager component 940 may correspond to, for example, the multiple connectivity CA manager component 640 and may include the functionality of the information convergence entity component 670. The processing system 914 may be implemented with a bus architecture, represented generally by the bus 902. The bus 902 may include any number of interconnecting buses and bridges depending on the specific application of the processing system 914 and the overall design constraints. The bus 902 links together various circuits including one or more processors (e.g., central processing units (CPUs), microcontrollers, application specific integrated circuits (ASICs), field programmable gate arrays (FPGAs)) represented generally by the processor 904, and computer-readable media, represented generally by the computer-readable medium 906. The bus 902 may also link various other circuits such as timing sources, peripherals, voltage regulators, and power management circuits, which are well known in the art, and therefore, will not be described any further. A bus interface 908 provides an interface between the bus 902 and a transceiver 910, which is connected to one or more antennas 920 for receiving or transmitting signals. The transceiver 910 and the one or more antennas 920 provide a mechanism for communicating with various other apparatus over a transmission medium (e.g., over-the-air). The transceiver 910 may be an example of the transmitter/receiver components 680 and 860 of FIGS. 6 and 8, respectively. Depending upon the nature of the apparatus, a user interface (UI) 912 (e.g., keypad, display, speaker, microphone, joystick) may also be provided.

The processor 904 is responsible for managing the bus 902 and general processing, including the execution of software stored on the computer-readable medium 906. The software, when executed by the processor 904, causes the processing system 914 to perform the various functions described herein for any particular apparatus. The computer-readable medium 906 may also be used for storing data that is manipulated by the processor 904 when executing software. The multiple connectivity CA manager component 940 as described above may be implemented in whole or in part by processor 904, or by computer-readable medium 906, or by any combination of processor 904 and computer-readable medium 906.

Figure 10:
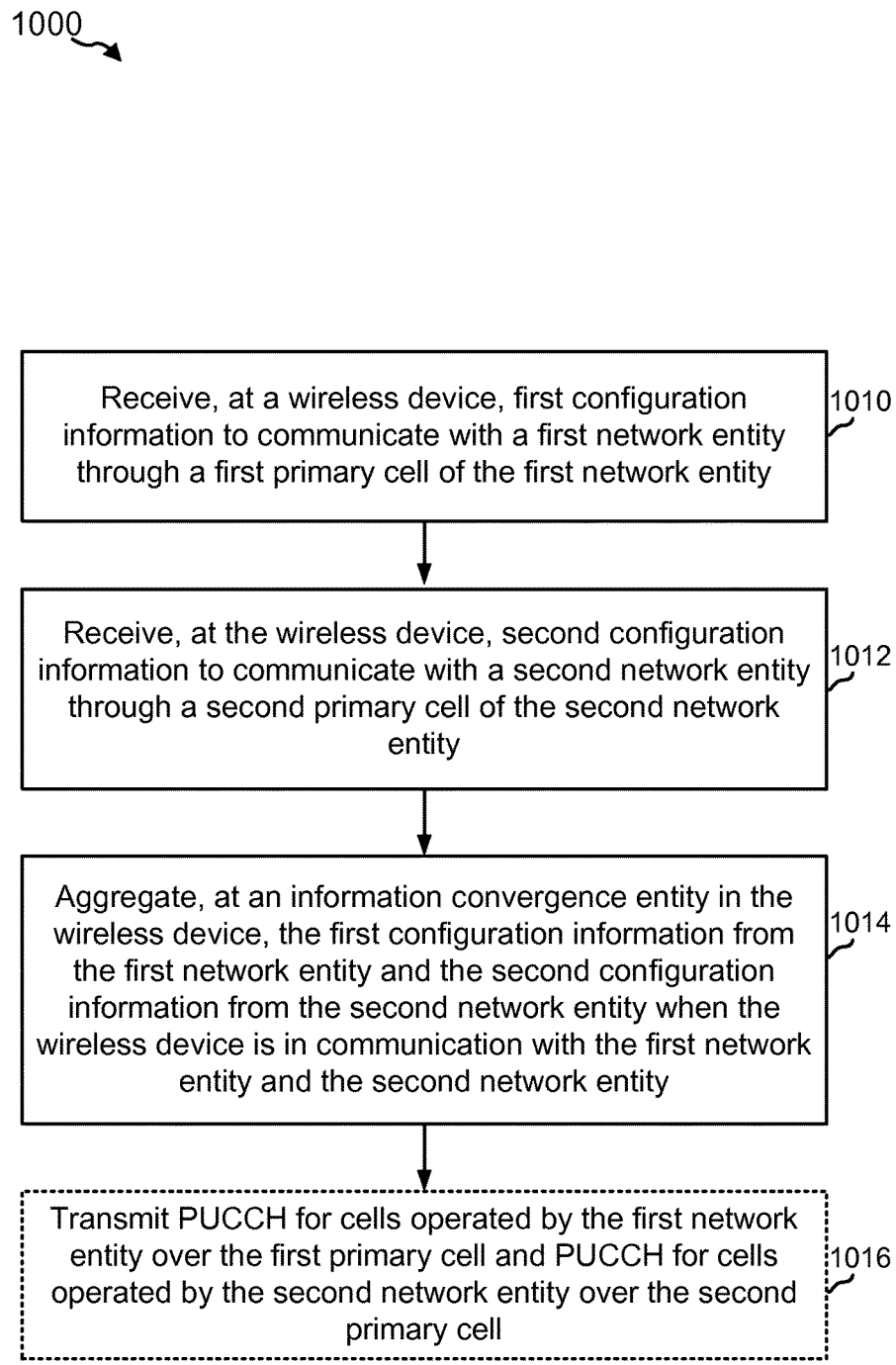
FIG. 10 is a flowchart illustrating a method for carrier aggregation in dual connectivity in a UE, in accordance with an aspect of the present disclosure.

FIG. 10 is a flowchart illustrating a method 1000 for aggregation in dual connectivity in a UE (e.g., UE 615) in accordance with an aspect of the present disclosure. Some or all of the method 1000 may be implemented by the UEs of FIGS. 1-8 and/or the processing system 914 of FIG. 9.

At block 1010, a wireless device (e.g., UE) may receive first configuration information to communicate with a first network entity (e.g., MeNodeB or MeNB) through a first primary cell (e.g., PCell) of the first network entity. For example, the multiple connectivity CA manager component 640, the information convergence entity component 670, and/or the transmitter/receiver component 680 of FIG. 6 may receive the configuration information.

At block 1012, the wireless device may receive second configuration information to communicate with a second network entity (e.g., SeNodeB or SeNB) through a second primary cell (e.g., $PCell_{SCG}$) of the second network entity. For example, the multiple connectivity CA manager component 640, the information convergence entity component 670, and/or the transmitter/receiver component 680 of FIG. 6 may receive the configuration information. The second network entity may be non-collocated with the first network entity.

At block 1014, an information convergence entity in the wireless device may aggregate the first configuration information and the second configuration information received from the first network entity and the second network entity when the wireless device is in communication with the first network entity and the second network entity. For example, the information convergence entity component 670 of FIG. 6 may aggregate the configuration information.

Optionally at block 1016, the wireless device may transmit PUCCH for cells operated by the first network entity over the first primary cell and PUCCH for cells operated by the second network entity over the second primary cell. For example, the multiple connectivity CA manager component 640, the CA control component 654, the information convergence entity component 670, and/or the transmitter/receiver component 680 of FIG. 6 may operate to transmit PUCCH.

Figure 11:
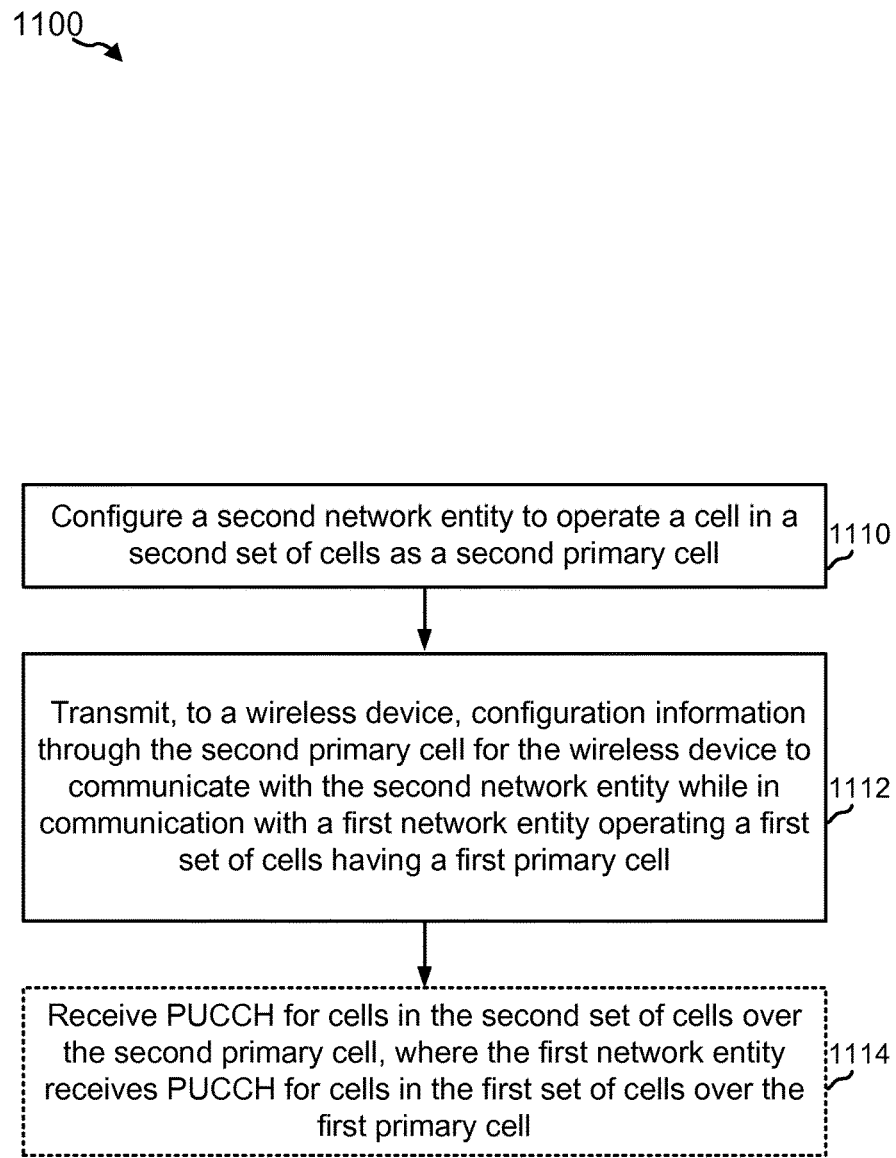
FIG. 11 is a flowchart illustrating a method for carrier aggregation in dual connectivity in a secondary eNodeB, in accordance with an aspect of the present disclosure.

FIG. 11 is a flowchart illustrating a method 1100 for aggregation in dual connectivity in a secondary eNodeB (e.g., eNodeB 805-a) in accordance with an aspect of the present disclosure. Some or all of the method 1100 may be implemented by the SeNodeBs/SeNBs of various Figures and/or the processing system 914 of FIG. 9.

At block 1110, a second network entity (e.g., SeNodeB) is configured to operate a cell in a group of cells (e.g., SCG) as a second primary cell ($PCell_{SCG}$). For example, the multiple connectivity CA manager component 840 and/or the $PCell_{SCG}$ configuration component 850 of FIG. 6 may configure a cell in an SCG as a secondary primary cell.

At block 1112, the second network entity may transmit to a wireless device (e.g., UE) configuration information through the second primary cell for the wireless device to communicate with the second network entity while in communication with a first network entity (e.g., MeNodeB) operating a first set of cells having a first primary cell (e.g., PCell). For example, the multiple connectivity CA manager component 840 and/or the transmitter/receiver component 860 of FIG. 6 may transmit configuration information. The first network entity may be non-collocated with the second network entity.

Optionally at block 1114, the second network entity may receive PUCCH for cells in the second set of cells over the second primary cell, where the first network entity receives PUCCH for cells in the first set of cells over the first primary cell. For example, the multiple connectivity CA manager component 840, the UE configuration component 852, and/or the transmitter/receiver component 860 may operate to receive PUCCH for one or more cells.

The features described above with respect to FIG. 10 and FIG. 11 are provided by way of illustration and not of limitation. For example, one or more of the aspects described in each of methods 1000 and 1100 may be combined to produce variations in those methods. Moreover, those aspects of methods 1000 and 1100 referred to as optional may be implemented independently, that is, different optional aspects may be implemented independently from each other.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but it is to be accorded the widest scope consistent with the principles and novel features disclosed herein.

What is claimed is:

1. A method for aggregating data in wireless communications, the method comprising:
   receiving, at a wireless device, first configuration information to communicate with a first network entity through a first primary cell of a first set of cells of the first network entity;
   receiving, at the wireless device, second configuration information to communicate with a second network entity through a second primary cell of a second set of cells of the second network entity;
   aggregating, at an information convergence entity in the wireless device, the first configuration information from the first network entity and the second configuration information from the second network entity when the wireless device is in communication with the first network entity and the second network entity; and
   establishing dual communications with the first network entity and the second network entity,
   wherein, based at least on the received first configuration information, the first primary cell is configured to:
   carry physical uplink control channel (PUCCH) for cells in the first set of cells,
   enable the first set of cells to have same discontinuous reception (DRX) configuration,
   configure and provide random access resources for one or both of contention-based and contention-free random access on the first network entity,
   enable downlink grants to convey transmit power control (TPC) commands for PUCCH, and
   enable pathloss estimation for cells in the first set of cells, and
   wherein the first primary cell has a common search space and a semi-persistent scheduling.

2. The method of claim 1, wherein the first network entity operates the first set of cells including the first primary cell and a first set of one or more secondary cells, and the second network entity operates the second set of cells including the second primary cell and a second set of one or more secondary cells.

3. The method of claim 2, wherein the first primary cell is configured to provide upper level functionalities at the wireless device, and wherein the upper level functionalities include one or more of a security functionality, or a connection to a network functionality, or an initial connection functionality, or a radio link failure functionality.

4. The method of claim 2, wherein the first primary cell is configured to provide upper layer entity functionalities at the information convergence entity in the wireless device, and wherein the information convergence entity being one of a packet data convergence protocol (PDCP) entity, or an internet protocol (IP) entity, or a radio resource control (RRC) entity.

5. The method of claim 2, wherein the first network entity and the second network entity are non-collocated.

6. The method of claim 2, wherein the second primary cell is configured to cross-carrier control any cell from the second set of one or more secondary cells, and each cell in the second set of one or more secondary cells is not configured to cross-carrier control the second primary cell.

7. The method of claim 6, wherein any one of the cells in the second set of one or more secondary cells is configured to cross-carrier control one or more of the remaining cells in the second set of one or more secondary cells.

8. The method of claim 2, wherein the second primary cell has a lowest cell index in the second set of cells operated by the second network entity.

9. The method of claim 1, wherein the second primary cell is configured to provide lower layer entity functionalities for the second network at a layer entity in the wireless device.

10. The method of claim 9, wherein the lower layer entity includes at least one of a radio link control (RLC) entity, or a media access control (MAC) layer entity or physical layer entity.

11. The method of claim 9, wherein the lower layer entity functionalities include at least one of the following functionalities:
    carry PUCCH for cells in the second set of cells, or
    enable the second set of cells to have the same DRX configuration, or
    configure random access resources for one or both of contention-based and contention-free random access on the second network entity, or
    downlink grants to convey TPC commands for PUCCH, or
    pathloss estimation for cells in the second set of cells, and
    wherein the second primary cell has a common search space configured among the cells in the second set of cells.

12. The method of claim 11, wherein the second primary cell has configured a semi-persistent scheduling.

13. The method of claim 1, further comprising:
    estimating a first pathloss associated with the first network entity based at least in part on the first primary cell; and
    estimating a second pathloss associated with the second network entity based at least in part on the second primary cell.

14. The method of claim 1, further comprising receiving the first configuration information and the second configuration information from an RRC entity.

15. The method of claim 1, wherein the information convergence entity comprises one of a PDCP entity, or an IP entity, or an RRC entity.

16. The method of claim 1, wherein aggregating, at the information convergence entity, data packets received from the first network entity and the second network entity comprises receiving a data packet of a bearer suitable for sounding reference signal (SRS) transmission through both the first network entity and the second network entity.

17. The method of claim 1, wherein the first configuration information comprises power headroom reporting information for the first primary cell and the second configuration information comprises power headroom reporting information for the second primary cell.

18. The method of claim 1, wherein the first configuration information comprises logical channel (LC) information corresponding to bearers configured on the first network entity and mapped to uplink grants received by the wireless device on component carriers of the first set of cells operated by the first network entity.

19. The method of claim 1, wherein the second configuration information comprises LC information corresponding to bearers configured on the second network entity and mapped to uplink grants received by the wireless device on component carriers of the second set of cells operated by the second network entity.

20. The method of claim 1, wherein the first configuration information comprises SRS information for the first primary cell and the second configuration information comprises SRS information for the second primary cell.

21. The method of claim 1, wherein the first network entity is a first base station and the second network entity is a second base station.

22. An apparatus for aggregating data in wireless communications, the apparatus comprising:
  means for receiving, at a wireless device, first configuration information to communicate with a first network entity through a first primary cell of a first set of cells of the first network entity;
  means for receiving, at the wireless device, second configuration information to communicate with a second network entity through a second primary cell of a second set of cells of the second network entity; means for aggregating, at an information convergence entity in the wireless device, the first configuration information from the first network entity and the second configuration information from the second network entity when the wireless device is in communication with the first network entity and the second network entity; and
  means for establishing dual communications with the first network entity and the second network entity,
  wherein, based at least on the received first configuration information, the first primary cell is configured to:
  carry physical uplink control channel (PUCCH) for cells in the first set of cells,
  enable the first set of cells to have same discontinuous reception (DRX) configuration,
  configure and provide random access resources for one or both of contention-based and contention-free random access on the first network entity,
  enable downlink grants to convey transmit power control (TPC) commands for PUCCH, and
  enable pathloss estimation for cells in the first set of cells, and
  wherein the first primary cell has a common search space and a semi-persistent scheduling.

23. A non-transitory computer readable medium storing computer executable code, that, when executed by a processor, enable the processor to perform the following functions, the non-transitory-readable storage medium comprising:
  code for receiving, at a wireless device, first configuration information to communicate with a first network entity through a first primary cell of a first set of cells of the first network entity;
  code for receiving, at the wireless device, second configuration information to communicate with a second network entity through a second primary cell of a second set of cells of the second network entity;
  code for aggregating, at an information convergence entity in the wireless device, the first configuration information from the first network entity and the second configuration information from the second network entity when the wireless device is in communication with the first network entity and the second network entity; and
  code for establishing dual communications with the first network entity and the second network entity,
  wherein, based at least on the received first configuration information, the first primary cell is configured to:
  carry physical uplink control channel (PUCCH) for cells in the first set of cells,
  enable the first set of cells to have same discontinuous reception (DRX) configuration,
  configure and provide random access resources for one or both of contention-based and contention-free random access on the first network entity,
  enable downlink grants to convey transmit power control (TPC) commands for PUCCH, and
  enable pathloss estimation for cells in the first set of cells, and
  wherein the first primary cell has a common search space and a semi-persistent scheduling.

24. A communications device for aggregating data in wireless communications, comprising:
  a processor;
  a memory coupled to the processor, wherein the memory includes instructions executable by the processor to:
  receive first configuration information to communicate with a first network entity through a first primary cell of a first set of cells of the first network entity, wherein the carrier aggregation manager component is further configured to receive second configuration information to communicate with a second network entity through a second primary cell of a second set of cells of the second network entity;
  aggregate the first configuration information from the first network entity and the second configuration information from the second network entity when the wireless device is in communication with the first network entity and the second network entity; and
  establish dual communications with the first network entity and the second network entity,
  wherein, based at least on the first received configuration information, the first primary cell is configured to:
  carry physical uplink control channel (PUCCH) for cells in the first set of cells,
  enable the first set of cells to have same discontinuous reception (DRX) configuration,
  configure and provide random access resources for one or both of contention-based and contention-free random access on the first network entity,
  enable downlink grants to convey transmit power control (TPC) commands for PUCCH, and
  enable pathloss estimation for cells in the first set of cells, and
  wherein the first primary cell has a common search space and a semi-persistent scheduling.

25. A method for aggregating data in wireless communications, the method comprising:
  configuring a second network entity to operate a cell in a second set of cells as a second primary cell and to enable the second set of cells to have same discontinuous reception (DRX) configuration; and
  transmitting, to a wireless device, configuration information through the second primary cell for the wireless device to communicate with the second network entity while in communication with a first network entity operating a first set of cells having a first primary cell, wherein the first primary cell is configured to:
  carry physical uplink control channel (PUCCH) for cells in the first set of cells,
  include the lowest cell index among the first set of cells,
  enable the first set of cells to have same discontinuous reception (DRX) configuration,
  configure and provide random access resources for one or both of contention-based and contention-free random access on the first network entity,
  enable downlink grants to convey transmit power control (TPC) commands for PUCCH, and
  enable pathloss estimation for cells in the first set of cells, and
wherein the first primary cell has a common search space and a semi-persistent scheduling.

26. The method of claim 25, wherein the first primary cell is configured to provide upper level functionalities at the wireless device, the upper level functionalities including one or more of a security functionality, or a connection to a network functionality, or an initial connection functionality, or a radio link failure functionality.

27. The method of claim 25, wherein the first primary cell is configured to provide upper level functionalities at an entity in the wireless device, the entity being one of a packet data convergence protocol (PDCP) entity, or an internet protocol (IP) entity, or a radio resource control (RRC) entity.

28. The method of claim 25, wherein the second primary cell is configured to provide at least one of the following lower layer entity functionalities:
  carry PUCCH for cells in the second set of cells, or
  include the lowest cell index among the second set of cells, or
  configure random access resources for one or both of contention-based and contention-free random access on the second network entity, or
  downlink grants to convey TPC commands for PUCCH, or
  pathloss estimation for cells in the second set of cells, and
wherein the second primary cell has a common search space configured among the cells in the second set of cells.

29. The method of claim 28, wherein the second primary cell has configured a semi-persistent scheduling.

30. The method of claim 25, wherein the first network entity and the second network entity are non-collocated.

31. An apparatus for aggregating data in wireless communications, the apparatus comprising:
  means for configuring a second network entity to operate a cell in a second set of cells as a second primary cell and to enable the second set of cells to have same discontinuous reception (DRX) configuration; and
  means for transmitting, to a wireless device, configuration information through the second primary cell for the wireless device to communicate with the second network entity while in communication with a first network entity operating a first set of cells having a first primary cell,
  wherein the first primary cell is configured to:
    carry physical uplink control channel (PUCCH) for cells in the first set of cells,
    include the lowest cell index among the first set of cells,
    enable the first set of cells to have same discontinuous reception (DRX) configuration,
    configure and provide random access resources for one or both of contention-based and contention-free random access on the first network entity,
    enable downlink grants to convey transmit power control (TPC) commands for PUCCH, and
    enable pathloss estimation for cells in the first set of cells, and
  wherein the first primary cell has a common search space and a semi-persistent scheduling.

32. A non-transitory computer readable storage medium storing computer executable code, that, when executed by a processor, enable the processor to perform the following functions, the non-transitory-readable storage medium comprising:
  code for configuring a second network entity to operate a cell in a second set of cells as a second primary cell and to enable the second set of cells to have same discontinuous reception (DRX) configuration; and
  code for transmitting, to a wireless device, configuration information through the second primary cell for the wireless device to communicate with the second network entity while in communication with a first network entity operating a first set of cells having a first primary cell,
  wherein the first primary cell is configured to:
    carry physical uplink control channel (PUCCH) for cells in the first set of cells,
    include the lowest cell index among the first set of cells,
    enable the first set of cells to have same discontinuous reception (DRX) configuration,
    configure and provide random access resources for one or both of contention-based and contention-free random access on the first network entity,
    enable downlink grants to convey transmit power control (TPC) commands for PUCCH, and
    enable pathloss estimation for cells in the first set of cells, and
  wherein the first primary cell has a common search space and a semi-persistent scheduling.

33. A network device for aggregating data in wireless communications, comprising:
  a processor;
  a memory coupled to the processor, wherein the memory includes instructions executable by the processor to:
  configure a second network entity to operate a cell in a second set of cells as a second primary cell and to enable the second set of cells to have same discontinuous reception (DRX) configuration; and
  transmit, to a wireless device, configuration information through the second primary cell for the wireless device to communicate with the second network entity while in communication with a first network entity operating a first set of cells having a first primary cell,
  wherein the first primary cell is configured to:
    carry physical uplink control channel (PUCCH) for cells in the first set of cells,
    include the lowest cell index among the first set of cells,
    enable the first set of cells to have same discontinuous reception (DRX) configuration,
    configure and provide random access resources for one or both of contention-based and contention-free random access on the first network entity,
    enable downlink grants to convey transmit power control (TPC) commands for PUCCH, and
    enable pathloss estimation for cells in the first set of cells, and
  wherein the first primary cell has a common search space and a semi-persistent scheduling.

* * * * *